US011578835B2

(12) United States Patent
Sanders

(10) Patent No.: US 11,578,835 B2
(45) Date of Patent: Feb. 14, 2023

(54) VARIABLE STIFFNESS BEAM

(71) Applicant: Michael Sanders, Pleasant Grove, UT (US)

(72) Inventor: Michael Sanders, Pleasant Grove, UT (US)

( * ) Notice: Subject to any disclaimer, the term of this patent is extended or adjusted under 35 U.S.C. 154(b) by 234 days.

(21) Appl. No.: 16/559,283

(22) Filed: Sep. 3, 2019

(65) Prior Publication Data
US 2021/0041063 A1    Feb. 11, 2021

Related U.S. Application Data

(60) Provisional application No. 62/725,309, filed on Aug. 31, 2018.

(51) Int. Cl.
*F16S 3/02* (2006.01)

(52) U.S. Cl.
CPC ..................... *F16S 3/02* (2013.01)

(58) Field of Classification Search
CPC ....... F16S 3/02; F16S 3/00; F16S 3/04; Y10T 403/7045; Y10T 403/364; A44B 19/00; A44B 19/02; A44B 19/10; A44B 19/14
USPC .... 403/345, 346, 347, 353, 359.1, 363, 373, 403/374.1; 292/307 R
See application file for complete search history.

(56) References Cited

U.S. PATENT DOCUMENTS

| | | | | |
|---|---|---|---|---|
| 664,239 | A * | 12/1900 | Doane | F16L 9/22 403/345 |
| 1,692,529 | A * | 11/1928 | Zagorski | B21C 23/145 140/71 B |
| 4,951,362 | A * | 8/1990 | Denemark | B65D 63/1072 292/307 R |
| 5,788,401 | A * | 8/1998 | Drenth | F16L 15/001 403/353 |
| 6,453,973 | B1 * | 9/2002 | Russo | A47F 5/11 52/592.1 |
| 7,416,363 | B2 * | 8/2008 | Kozhuev | F16B 5/008 52/592.1 |
| 10,568,374 | B2 * | 2/2020 | Klein-Kassab | A41F 1/002 |
| 2002/0108722 | A1 * | 8/2002 | Lee | B27M 3/006 160/236 |
| 2006/0112523 | A1 * | 6/2006 | Deto | A41F 1/002 24/303 |
| 2017/0218992 | A1 * | 8/2017 | Sodore | F16B 5/07 |

FOREIGN PATENT DOCUMENTS

CN    106287010 A *    1/2017

* cited by examiner

*Primary Examiner* — Terrell L McKinnon
*Assistant Examiner* — Michael McDuffie

(57) ABSTRACT

A beam assembly includes a first beam member and a second beam member. The first and second beam members are both flexible when separated from each other. The first and second beam members each include compression and tension elements. The first and second beam members can be joined to form a stiff beam by interleaving the compression elements of the first and second beam members.

11 Claims, 27 Drawing Sheets

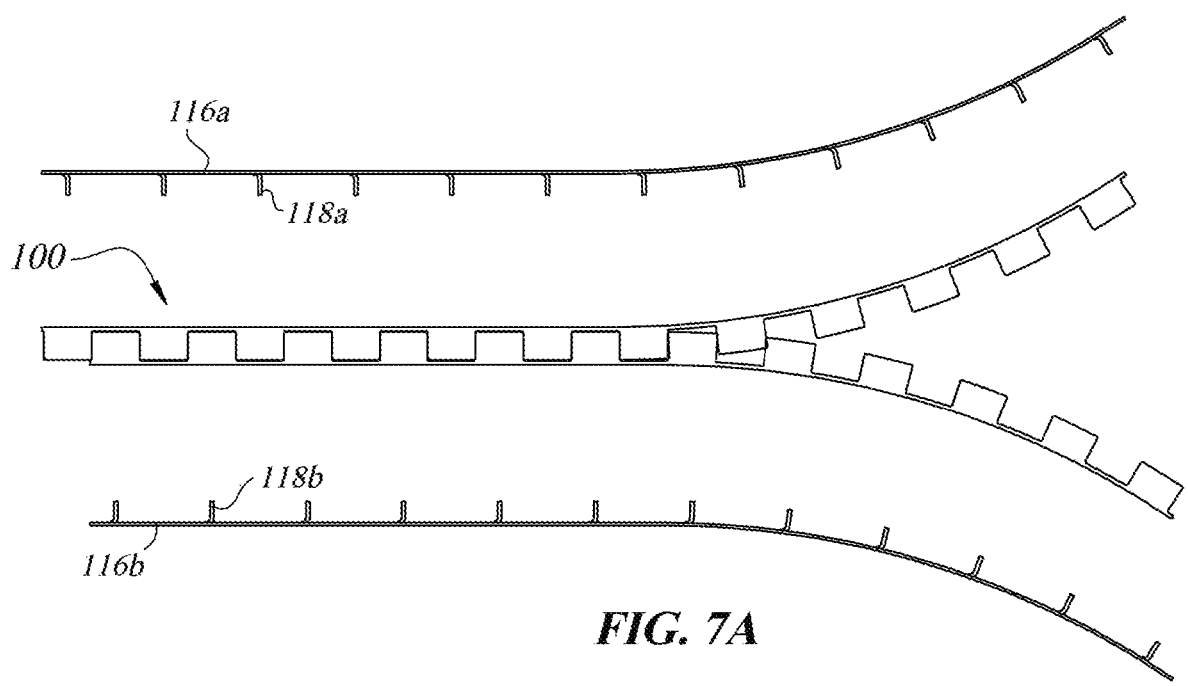
FIG. 7A
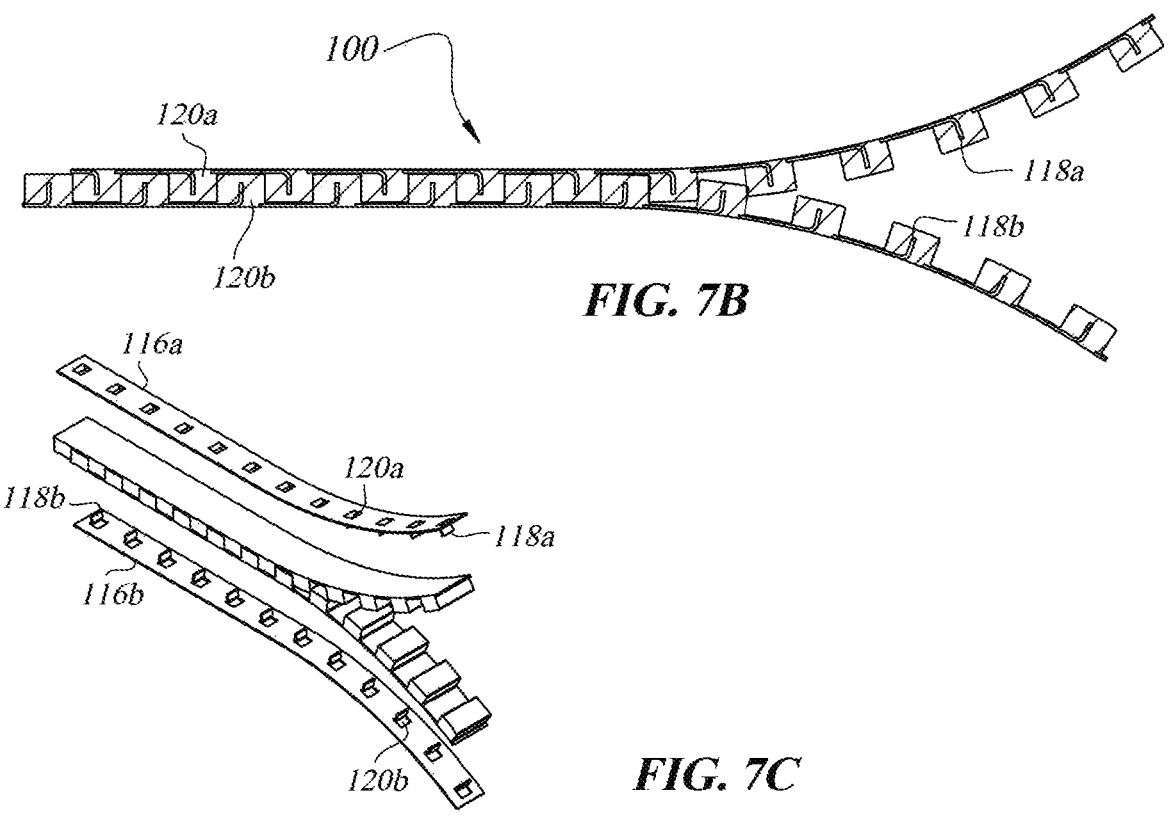
FIG. 7B
FIG. 7C

VARIABLE STIFFNESS BEAM

CROSS REFERENCE TO RELATED APPLICATION

The present application claims priority benefit from U.S. Provisional Patent Application No. 62/725,309, filed on Aug. 31, 2018, titled "Variably Rigid Beam". U.S. Provisional Patent Application Number 62725309 is incorporated herein by reference in its entirety.

BACKGROUND

In loading a typical beam in bending, there exists a compression side and a tension side as it relates to stresses. In terms of finite elements, one might imagine the beam as composed of an array of nodes connected by springs where nodes tend to move away from each other on the tension side and toward each other on the compression side with the neutral axis as something of a fulcrum. If the beam is thought of as a finite number of discrete layers, during bending as the beam takes on an arc shape, the length of a layer must extend (to stretch or compress) is theoretically equal to the arc length. The arc length for each layer is defined, in part, by the distance of the layer from the radius center. Thus, in the case of discrete layers there is slipping between layers during bending. In the case of a typical beam, this would be characterized as shear stress. As beam thickness reduces, bending stress reduces, assuming a displacement driven system.

BRIEF SUMMARY

One embodiment is a variable stiffness beam that overcomes drawbacks of previous beams by taking advantage of some of the factors mentioned above. In one embodiment, a tension member is characterized as elements that are well-suited to handle required tensile loads as well as common bending and torsion without inducing stresses that exceed material strength. A compression element is composed of elements that are well-suited for handling compression loads. Tension elements can be enabled to bend through principles of complaint mechanisms, pin joints, or other methods and modulate the compression side by adding or removing compression elements, thus controlling bending or flexibility and rigidity in the overall beam. This can be done for single, bimodal, or multimode bending. This has several advantages and applications, as will be set forth in more detail below.

One embodiment is a beam assembly including a first beam member. The first beam member includes first tension elements and first compression elements. The beam assembly includes a second beam member. The second beam member includes second tension elements and second compression elements. The first and second beam members are configured to join together to form a beam by interleaving the first and second compression elements.

One embodiment is a device including a first beam member. The first beam member includes a plurality of first flexible elements and a plurality of first protrusions each protruding relative to the first flexible elements and each positioned between two first flexible elements. The device includes a second beam member including a plurality of second flexible elements and a plurality of second protrusions each protruding relative to the first flexible elements and each positioned between two second flexible elements. The first and second beam members are configured to join together to form a beam assembly by interleaving the first and second protrusions.

One embodiment is a device including a first beam member. The first beam member includes a substantially flat top surface and an uneven bottom surface defined by an array of first protrusions protruding downward. The device includes a second beam member. The second beam member includes a substantially flat bottom surface and an uneven top surface defined by an array of second protrusions protruding upward. The first and second beam members are configured to be joined together as a beam assembly by interleaving the first and second protrusions. When the first and second beam members are joined together, the beam assembly has a flexibility that is at least an order of magnitude lower than a flexibility of either the first and second beam members when they are separated from each other.

BRIEF DESCRIPTION OF THE SEVERAL VIEWS OF THE DRAWINGS

FIG. 7A is a side view of a beam assembly, according to an embodiment.

FIG. 7B is a cross-sectional view of the beam assembly of FIG. 7A, according to an embodiment.

FIG. 7C is a perspective view of the beam assembly of FIG. 7A, according to an embodiment.

FIG. 21C is a perspective view of the beam assembly of FIG. 21A, according to an embodiment.

DETAILED DESCRIPTION

The following discussion describes several embodiments of beam assemblies. Some of the beam assemblies include multiple beam members. The beam members are described as being "flexible" or "substantially flexible" when they are separated from each other. The beam assemblies are described as being stiff or having reduced flexibility when the beam members are joined together. In some cases, the difference in stiffness or flexibility between joined and separated states is described as being an order of magnitude or more. In these cases, the flexibility can correspond to the linear deflection as calculated for cantilevered beams or for simply supported beams. As used herein, stiffness can correspond to the inverse of deflection.

Thus, in one example, deflection of a beam, a beam assembly, or a beam member can correspond to the downward deflection of the beam, beam assembly, or beam member if it were cantilevered and a downward force was applied. When comparing the deflection (flexibility) of beam assemblies or beam members, the deflection is assumed to be calculated for a same beam length, material, and applied force.

As used herein, the term "tension element" includes, but is not limited to, portions of a beam or member that enable the beam or member to flex, bend, or pivot. As used herein, the term "compression element" includes, but is not limited to portions of a beam or member that protrude from the tension elements or that protrude relative to the tension elements. Compression elements can include elements that impede flexing. Accordingly, the tension elements can correspond to flexing elements, and the compression elements con correspond to protrusions.

As used herein, the term "order of magnitude" corresponds to a factor of ten. Accordingly, one order of magnitude is a factor of 10, two orders of magnitude is a factor of 100, etc.

Figure 1A:
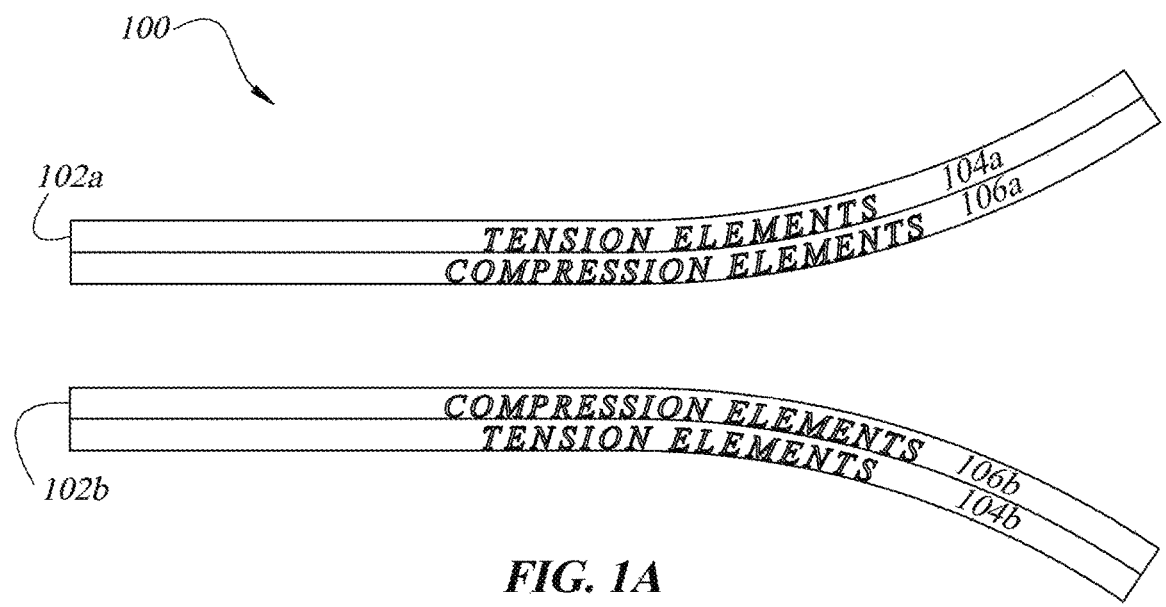
FIG. 1A is a simplified block diagram of a beam assembly in a separated state, according to one embodiment.

FIG. 1A is a simplified block diagram of a variably rigid beam assembly 100 in a disassembled state, according to one embodiment. The variably rigid beam assembly 100 includes a first beam member 102a and a second beam member 102b. The first beam member 102a includes tension elements 104a and compression elements 106a. The second beam member 102b includes compression elements 106b and tension elements 104b. As will be set forth in more detail below, in the separated state the first and second beam members 102a, 102b have a first flexibility. In the joined state, the variably rigid beam assembly 100 has a flexibility that is significantly lower than the flexibilities of the first and second beam members 102a, 102b in the separated state.

In one embodiment, the tension elements 104a enable flexing of the first beam member 102a when the first beam member 102a is separated from the second beam member 102b. The tension elements 104a are elements suited to handle tensile loads and to accommodate bending and torsion without inducing stresses that exceed material strength. Thus, in one sense, the tension elements 104a can be thought of as joints that enable bending or flexing. In the separated state, the overall flexibility of the first beam member 102a is relatively high due to the tension elements 104a.

In one embodiment, the compression elements 106a include elements that are suited for handling compression loads. As will be set forth in more detail below, the compression elements 106a assist in providing rigidity to the beam assembly 100 in the joined state.

In one embodiment, the tension elements 104b enable flexing of the second beam member 102b when the second beam member 102b is separated from the first beam member 102a. The tension elements 104b are elements suited to handle tensile loads and tend to accommodate bending and torsion without inducing stresses that exceed the material strength. Thus, in one sense, the tension elements 104b can be thought of as joints that enable bending or flexing of the second beam member 102b. In the separated state, the overall flexibility of the second beam member 102b is relatively high due to be tension elements 104b.

In one embodiment, the compression elements 106b include elements that are suited for handling compression loads. As will be set forth in more detail below, the compression elements 106b assist in providing rigidity to the beam assembly 100 in the joined state.

Figure 1B:
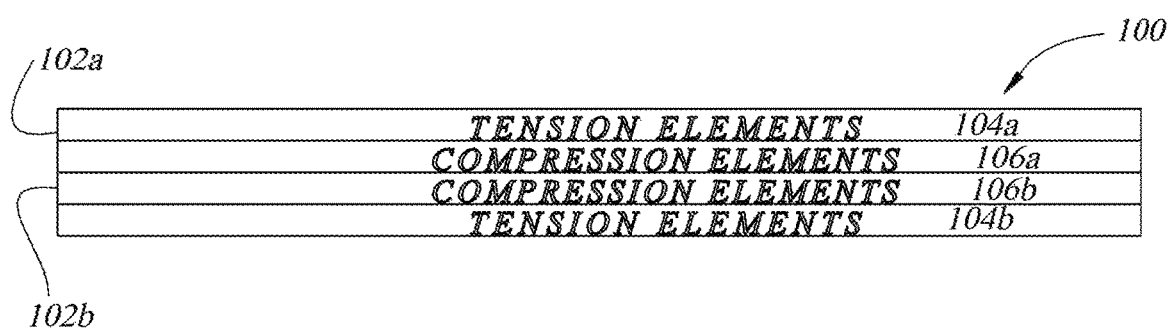
FIG. 1B is a block diagram of the beam assembly in a joined state, according to one embodiment.

FIG. 1B is a block diagram of the beam assembly 100 in a joined state, in accordance with one embodiment. In the joined state, the first and second beam members 102a, 102b are joined together in a stable configuration. In the joined state, the beam assembly 100 is significantly less flexible than are either of the first and second beam members 102a, 102b in the separated state. For example, in the joined state, the beam assembly 100 has a flexibility that is at least an order magnitude less than the flexibility of either of the first and second beam members 102a, 102b in the separated state.

In one embodiment, the first and second tension elements 104a, 104b, and the first and second compression elements 106a, 106b are arranged to enable the first and second beam members 102a, 102b to stably join together. In the joined state, the first and second compression elements 106a, 106b are interleaved together. In particular, in the joined state, each first compression element 106a is positioned between two compression elements 106b. Likewise, in the joined state, each second compression element 106b is positioned between two first compression elements 106a.

In one embodiment, in the joined state, first compression elements 106a are in contact with the second tension elements 104b. Likewise, the second compression elements 106b are in contact with the first tension elements 104a. The contact with compression elements results in significantly less flexibility for the first and second tension elements 104a, 104b in the joined state than in the separated state. Thus, in the joined state, the beam assembly 100 becomes significantly less flexible, or significantly stiffer than either of the first and second beam members 102a, 102b in the separated state.

In one embodiment, the beam assembly 100 has several advantages over traditional beams. For example, the first and second beam members 102a, 102b can be rolled up for easy storage and transport. This is because the first and second beam members 102a, 102b can be separated from each other. In the separated state, the first and second beam members 102a, 102b are highly flexible. This high degree of flexibility enables storage and transport of the beams in a rolled up or otherwise bent configuration.

In one embodiment, another advantage of the beam assembly 100 is that the first and second beam members 102a, 102b can be made from materials that, by themselves, do not provide a stiffness that could support much weight without an unacceptable level of bending. Traditional beams are made from materials that are relatively stiff, such as solid wood or metal. These traditional materials have a thickness that results in relatively little bending under expected loads. The first and second beam members 102a, 102b can be made from materials that, by themselves, are not stiff enough to support a desired load, but when joined together as described above, provide sufficient stiffness for the desired load.

In one example, a traditional shelf for a kitchen cupboard may be made from a solid piece of wood. The flexible beam 100 can replace the traditional shelf using materials that are less expensive than wood. For example, each of the first and second beam members 102a, 102b may be made from a relatively thin and inexpensive plastic material. If either of the first or second beam members alone 102a, 102b were placed as a shelf in a cupboard, the first or second beam members 102a, 102b would not support the weight of typical kitchen implements such as bowls, plates, or glasses without an unacceptable level of bending or without collapsing completely. However, when the first and second beam members 102a, 102b are joined together and placed as a shelf in the cupboard, the beam assembly 100 is sufficiently stiff to support the typical kitchen implements. The flexible beam 100 can be implemented in a large variety of applications. The flexible beam 100 can act as a tabletop, a top of a bench, a seat, a tray, a closet shelf, or in any of a large number of typical implementations in which a flat surface will be used to support weight or will act as a covering.

In one embodiment, the flexible beam 100 can be used in heavy-duty applications. For example, the beam assembly 100 can be utilized as a bridge that can be quickly assembled for emergency situations. Because the first and second beam members 102a, 102b can be rolled up, the first and second beam members can be carried in the rolled up state in the back of a truck. The beam assembly 100 can be rapidly placed in the joined state and laid as a bridge for vehicles or personnel to pass over obstacles such as running water, ditches, or ravines.

In one embodiment, the dimensions of the first and second beam members 102a, 102b are selected based on the selected application of the beam assembly 100. The dimensions of the first and second tension elements 104a, 104b, and of the first and second compression elements 106a, 106b can be selected based on the anticipated load that will be placed on the beam assembly 100 in the joined state. Larger dimensions can be used for heavier loads.

In one embodiment, the first and second beam members 102a, 102b can be made from a large variety of materials. For example, the first and second beam members 102a, 102b can be made from polymers such as polyethylene, polypropylene, ABS, nylon, polycarbonate, or other types of polymers. The first and second beam members 102a, 102b can also be made from fibers such as carbon fiber, Kevlar, fiberglass, or other suitable fibers. In one embodiment, the first and second beam members 102a, 102b can include a polymer material with embedded fibers. The embedded fibers can augment the strength of the first and second beam members 102a, 102b. The first and second beam members 102a, 102b can include embedded cables or straps to augment the strength of polymers or fibers. For example, the embedded cables or straps could include metals such as iron, steel, aluminum, or other metals or alloys that can augment the strength of plastics or fibers.

Those of skill in the art will recognize, in light of the present disclosure, that the beam assembly 100 can be made from a large variety of materials and can have a large variety of shapes and dimensions without departing from the scope of the present disclosure.

Figure 2A:
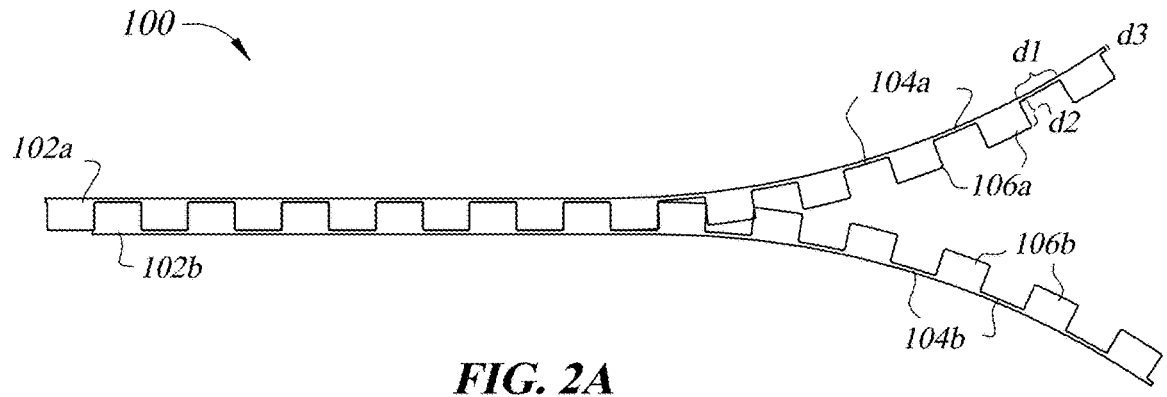
FIG. 2A is a side view of a beam assembly in a partially joined state, according to one embodiment.

FIG. 2A is a side view of a beam assembly 100 in a partially joined state, in accordance with one embodiment. The beam assembly 100 includes a first beam member 102a and a second beam member 102b. The beam assembly 100 can be placed in the separated state by peeling the first and second beam members 102a, 102b apart from each other. The beam assembly 100 can be placed in the joined state by pressing together the unjoined portions of the first and second beam members 102a, 102b.

In one embodiment, the first beam member 102a includes first tension elements 104a and first compression almonds 106a. The first compression elements 106a include protrusions extending downward from a top surface of the first beam member 102a. The protrusions have a substantially rectangular cross-section, though they may be rounded at the corners. Each first compression element 106a is positioned between two first tension elements 104a, though if a first compression element 106a is at an end of the first beam member 102a, then that first compression element 106a will only be connected to a single first tension element 104a.

Each first tension element 104a extends between two adjacent first compression elements 106a, though if a first tension element 104a is at an end of the first beam member 102a, then that first tension element 104a will only connect to a single first compression element 106a. The first tension elements 104a are relatively thin compared to the first compression elements 106a.

In one embodiment, the first tension elements 104a have a length D1. The first compression elements 106a have a thickness D2. The first tension elements have a thickness D3.

In one embodiment, the dimensions D1 and D2 are design parameters that are selected based on the application of the beam assembly 100. The greater the expected load that will be placed on the beam assembly 100, the larger the values of D1 and D2. The smaller the expected load that will be placed on the beam assembly 100, the smaller the values of D1 and D2.

In one embodiment, the ratio of D1 to D2 is between 0.4 and 0.8. The ratio can be smaller if greater stiffness is desired for the beam assembly 100 in the joined state. In one example, the ratio of D1 to D2 is about 0.6. The ratio can be larger if greater flexibility is desired for the beam assembly 100 in the joined state. The ratio of D2 to D3 is between 3 and 7. In one example, the ratio of D2 to D3 is about 5. The length of the compression elements 106a is approximately the same as the length D1 of the tension elements 104a. In practice, the length of the first compression elements 106a may be slightly less than the length of the first tension elements 104a, so that the first compression elements can interleave with second compression elements 106b.

In one embodiment, the first compression elements 106a are entirely solid. In other words, the first compression elements 106a are not hollow, in one embodiment.

In one exemplary application, in accordance with one embodiment, the beam assembly 100 is designed to be used as a spice rack to hold common kitchen spices in a kitchen cupboard. In this case, D1 is about 0.15 inches, D2 is about 0.25 inches, and D3 is about 0.5 inches In one exemplary application, in accordance with one embodiment, the beam assembly 100 is designed to be used as a bookshelf on which books will be set. In this case, D1 is about 1.25 inches, D2 is about 0.75 inches, and D3 is about 0.15 inches.

In one embodiment, the second beam member 102b includes second tension elements 104b and second compression elements 106b. The second compression elements 106b include protrusions extending upward from a bottom surface of the second beam member 102b. The protrusions have a substantially rectangular cross-section, though they may be rounded at the corners. Each second compression element 106b is positioned between two second tension elements 104b, though if a second compression element 106b is at an end of the second beam member 102b, then that second compression element 106b will only be connected to a single second tension element 104b. Each second tension element 104b extends between two adjacent second compression elements 106b, though if a second tension element 104b is at an end of the second beam member 102b, then that second tension element 104b will only connect to a single second compression element 106b. The second tension elements 104b are relatively thin compared to the second compression elements 106b.

In one embodiment, the dimensions of the second tension elements 104b and second compression elements 106b are substantially identical to the dimensions of the first tension elements 104a and the second tension elements 106a.

Because the dimensions are the same in the first and second beam members 102a, 102b, the first and second beam members 102a, 102b are able to be fitly joined together in the joined state. In some cases, the ends of the first and second beam members 102a, 102b may be different from each other. For example, a first end of the first beam member 102a may terminate with the first compression element 106a, while a first end of the second beam member 102b may terminate with a second tension elements 104b. Likewise, the second ends of the first and second beam members 102a, 102b may have complementary compression and tension elements so that when the first and second beam members 102a, 102b are joined together in the joined state, the thickness of the beam assembly 100 is uniform from end to end. Alternatively, the first and second beam members 102a, 102b may have identical terminations, resulting in a minor reduction in thickness at the ends of the beam assembly 100 when the first and second beam members 102a, 102b are joined together.

Figure 2B:
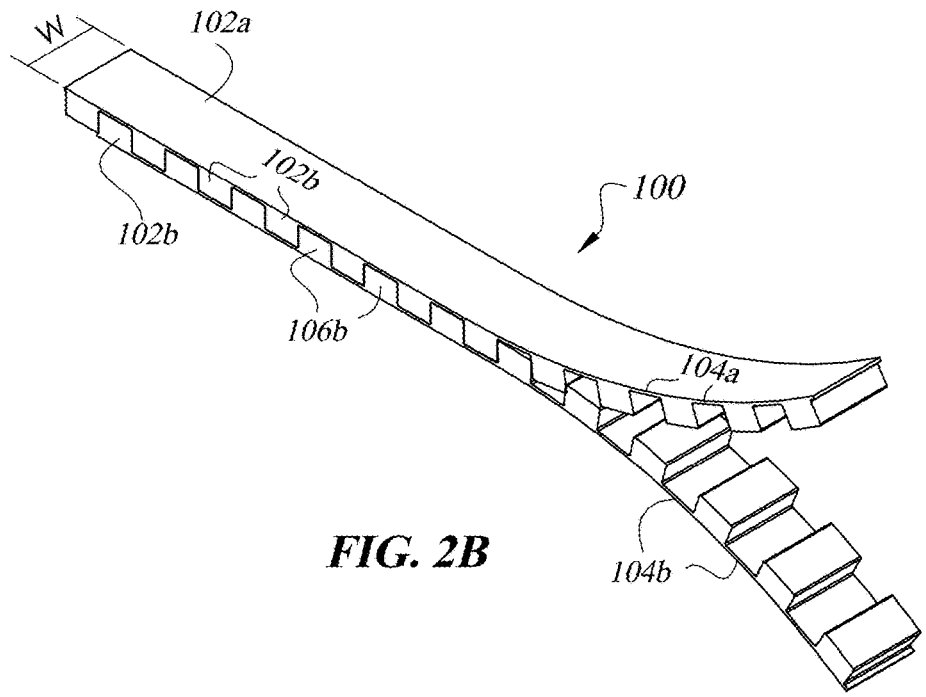
FIG. 2B is a perspective view of the beam assembly of FIG. 2A in the partially joined state.

FIG. 2B is a perspective view of the beam assembly 100 of FIG. 2A in the partially joined state. The perspective view gives a clearer indication of the structure of the first and second beam members 102a, 102b. For example, the perspective view illustrates that the first and second compression elements 106a, 106b and the first and second tension elements 104a, 104b have a uniform length along the width W of the first and second beam members 102a, 102b. In alternative embodiments, it is possible that the first and second compression elements 1068, 106b and the first and second tension elements 104a, 104b may have varying lengths along the width W of the first and second beam members 102a, 102b.

In one embodiment, the width W of the first and second beam members 102a, 102b is a design parameter selected based on the expected application of the beam assembly 100. Additionally, the total length of the first and second beam members 102a, 102b is selected based on the expected application of the beam assembly 100.

Figure 2C:
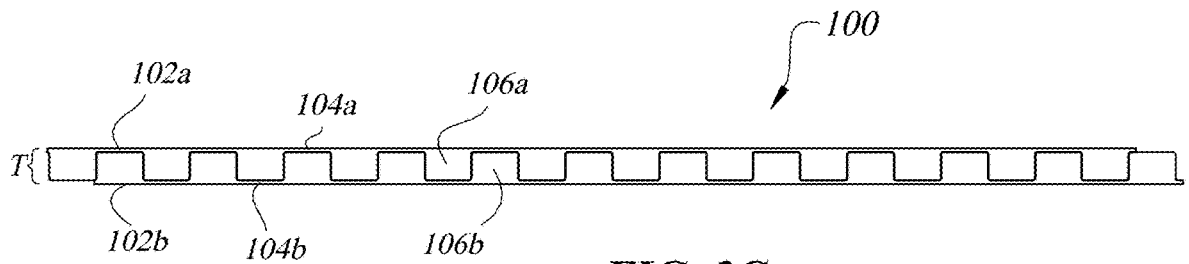
FIG. 2C is a side view of the beam assembly of FIG. 2A in the joined state.

FIG. 2C is a side view of the beam assembly 100 of FIG. 2A in the joined state. In the joined state, the first and second beam members 102a, 102b are completely joined together and the first and second compression elements 106a, 106b are interleaved with each other. Each first compression element 106a is positioned between two second compression elements 106b. Each second compression element 106b is positioned between two first compression elements 106a. Each first compression element 106a is in contact with a second tension element 104b. Each second compression element 160 is in contact with a first tension element 104a.

In one embodiment, the interleaving of the first and second compression elements 106a, 106b, as well as the contact between compression elements and the opposing tension elements results in a very large reduction in flexibility of the beam assembly 100 in the joined state with respect to the flexibility of the individual first and second beam members 102a, 102b in the separated state. This reduction of flexibility is based, in part, on the fact that the first and second tension elements 104a, 104b are not able to flex due to the interleaving of the first and second compression elements 106a, 106b. The interleaving of the first and second compression elements 106a, 106b reduces the flexibility of the beam assembly 100 in all dimensions or modes. The result is that the beam assembly 100 becomes very stiff. The beam assembly 100 can be used to support an application-specific amount of load without flexing or bending to an unacceptable degree.

In one embodiment, the total thickness T of the beam assembly 100 is D2+2*D3.

In one embodiment, the first and second beam members can be manufactured by stamping, injection molding, extrusion, 3D printing, or using other typical practices for manufacturing plastic members.

In the subsequent Figures, some embodiments are not shown in the fully joined state as in FIG. 2C. The various embodiments illustrated in the figures as being partially joined can each by fully joined as in FIG. 2C.

Figure 3A:
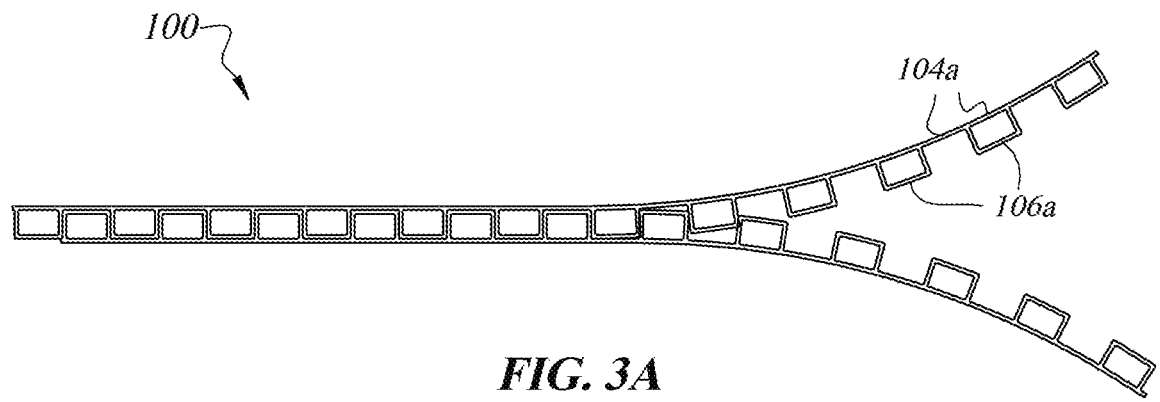
FIG. 3A is a side view of a beam assembly, according to an embodiment.

FIG. 3A is a side view of a beam assembly 100, according to an embodiment. The beam assembly 100 of FIG. 3A includes first and second beam members 102a, 102b. The first beam member 102a includes first tension elements 104a, and first compression elements 106a. The second beam member 102b includes second tension elements 104b and second compression elements 106b.

In one embodiment, the first and second beam members 102a, 102b of FIG. 3 a are substantially similar to the first and second beam members 102a, of 102b FIGS. 2A-2C, except that the first and second compression elements 106a, 106b of FIG. 3 are hollow. This hollow configuration provides several benefits, including increased flexibility in the separated state. This configuration also provides benefits that various connector pieces can be coupled within the hollow portion of the first and second compression elements 106a, 106b to enable various configurations of multiple in assemblies as will be shown and described with more detail in relation to FIGS. 24, 25.

The first and second beam members 102a, 102b are substantially flexible when separated from each other in the separated state. The beam assembly 100 of FIG. 3A is substantially stiff when the first and second beam members 102a, 102b are joined together. In one embodiment, the first and second beam members 102a, 102b have a flexibility that is one or more orders of magnitude higher in the separated state than is the beam assembly 100 in the joined state.

Figure 3B:
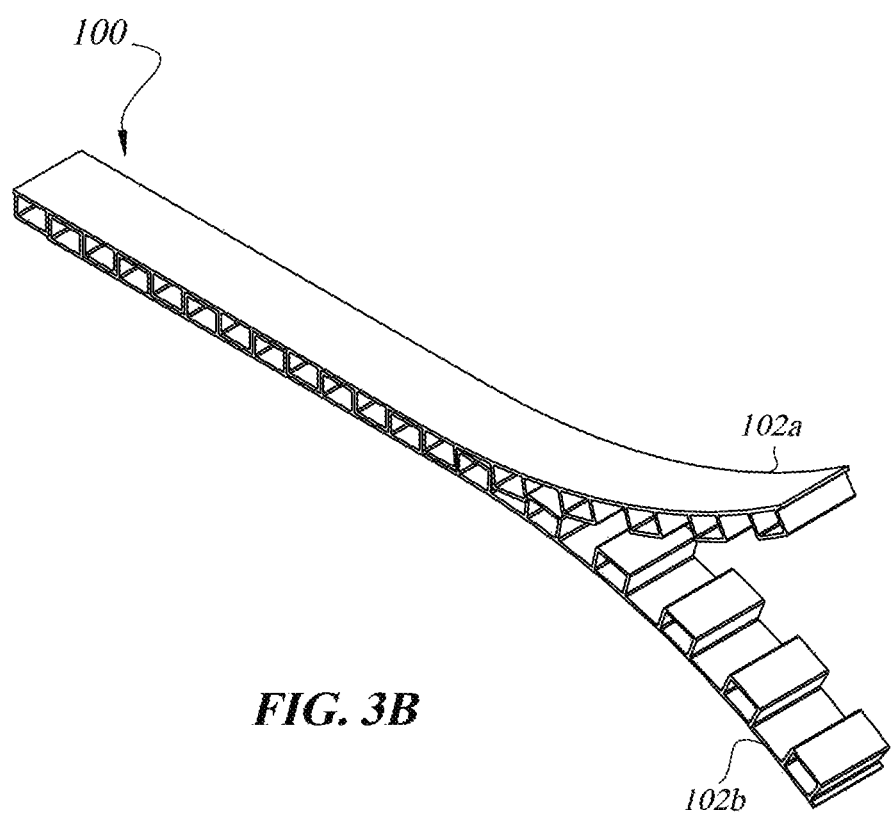
FIG. 3B is a perspective view of the beam assembly of FIG. 3A, according to an embodiment.

FIG. 3B is a perspective view of the beam assembly 100 of FIG. 3A.

Figure 4A:
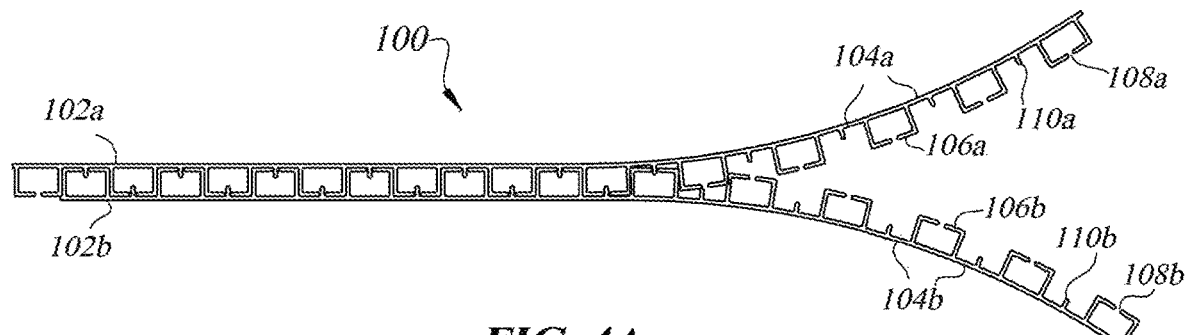
FIG. 4A is a side view of a beam assembly, according to an embodiment.

FIG. 4A is a side view of a beam assembly 100, according to an embodiment. The beam assembly 100 of FIG. 4A includes first and second beam members 102a, 102b. The first beam member 102a includes first tension elements 104a, and first compression elements 106a. The second beam member 102b includes second tension elements 104b and second compression elements 106b.

In one embodiment, the beam assembly 100 of FIG. 4A is substantially similar to the beam assembly 100 of FIG. 3A, except that each first compression element 106a includes a gap first 108a. The first beam member 102a also includes protrusions 110a between the compression elements 106a. Each second compression element 106b also includes a second gap 108b. The second beam member 102b also includes protrusions 110b.

In one embodiment, when the first and second beam members 102a, 102b are joined together, the first protrusions 110a are positioned in the gaps 108b. Likewise, the second protrusions 110b are positioned in the gaps 108a. This configuration promotes stiffness in the joined state and flexibility in the separated state.

Figure 4B:
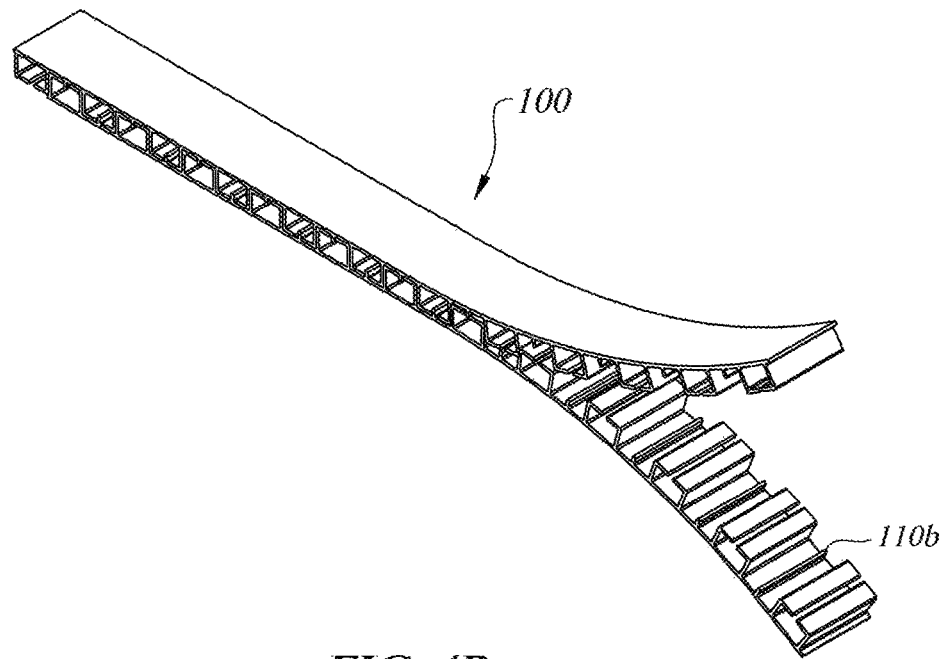
FIG. 4B is a perspective view of the beam assembly of FIG. 4A, according to an embodiment.

FIG. 4B is a perspective view of the beam assembly 100 of FIG. 4A.

Figure 5A:
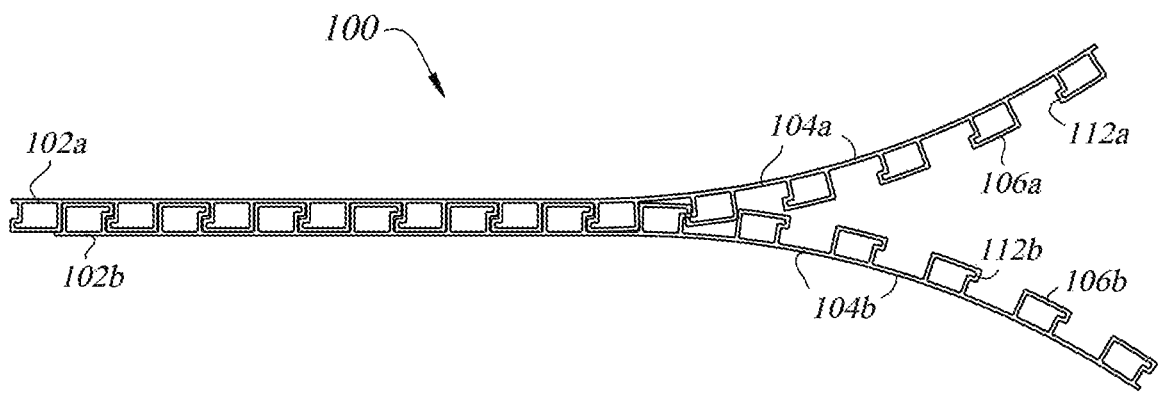
FIG. 5A is a side view of a beam assembly, according to an embodiment.

FIG. 5A is a side view of a beam assembly 100, according to an embodiment. The beam assembly 100 of FIG. 5A includes first and second beam members 102a, 102b. The first beam member 102a includes first tension elements 104a, and first compression elements 106a. The second beam member 102b includes second tension elements 104b and second compression elements 106b.

In one embodiment, the beam assembly 100 of FIG. 5A is substantially similar to the beam assembly 100 of FIG. 3A, except that each first compression element 106a includes a lateral protrusion 112a and each second compression element 106b also includes second lateral protrusions 112b. In one embodiment, when the first and second beam members 102a, 102b are joined together, the collateral protrusions promoted his stability of the beam assembly 100 because they act as a sort of latching mechanism.

Figure 5B:
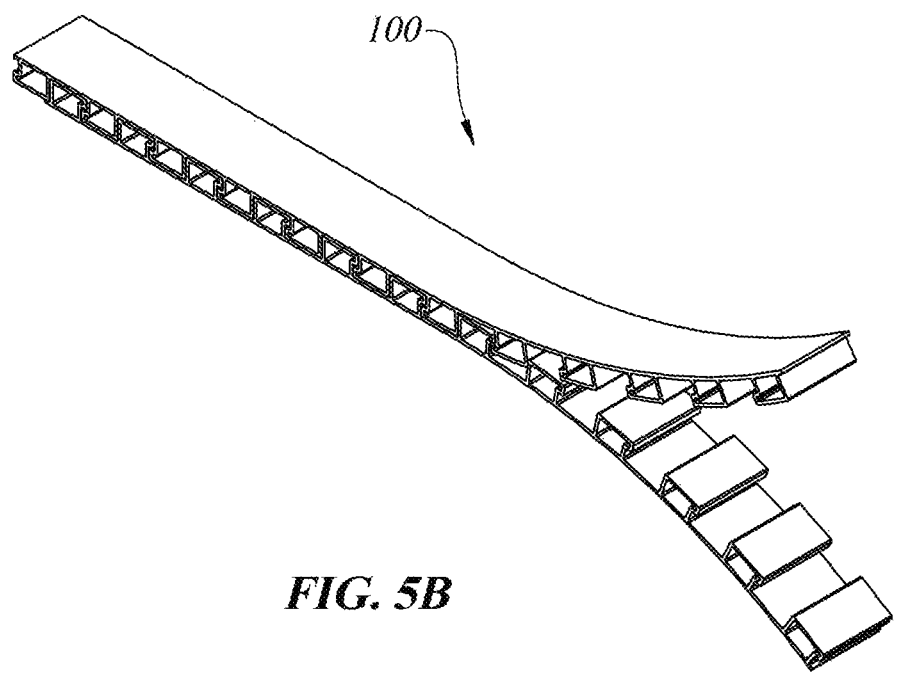
FIG. 5B is a perspective view of the beam assembly of FIG. 5A, according to an embodiment.

FIG. 5B is a perspective view of the beam assembly 100 of FIG. 5A.

Figure 6A:
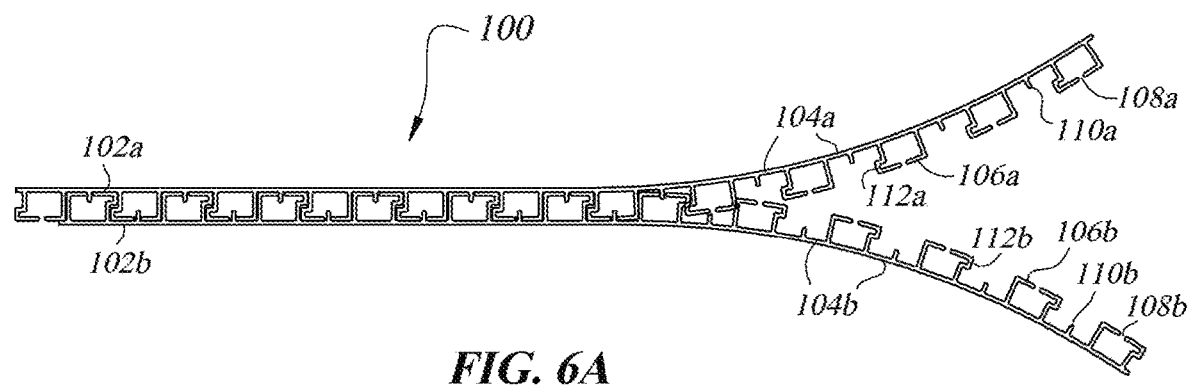
FIG. 6A is a side view of a beam assembly, according to an embodiment.

FIG. 6A is a side view of a beam assembly 100, according to an embodiment. The beam assembly 100 of FIG. 6A includes first and second beam members 102a, 102b. The first beam member 102a includes first tension elements 104a, and first compression elements 106a. The second beam member 102b includes second tension elements 104b and second compression elements 106b.

In one embodiment, the beam assembly 100 of FIG. 6A includes similarities with the beam assemblies 100 of FIGS. 4A-C and FIGS. 5A-C. In particular, the beam assembly 100 of FIG. 6A includes the gaps 108a, 108b, the protrusions 110a, 110b, and lateral protrusions 112a, 112b.

In one embodiment, when the first and second beam members 102a, 102b are joined together, the first protrusions 110a are positioned in the gaps 108b. Likewise, the second protrusions 110b are positioned in the gaps 108a. This configuration promotes stiffness in the joined state and flexibility in the separated state.

Figure 6B:
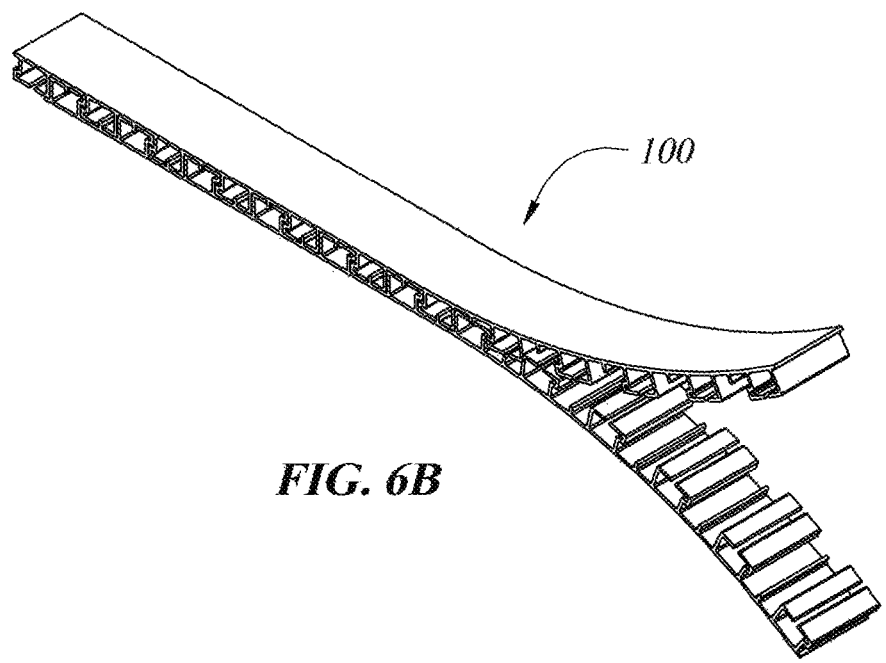
FIG. 6B is a perspective view of the beam assembly of FIG. 6A, according to an embodiment.

FIG. 6B is a perspective view of the beam assembly 100 of FIG. 6A.

FIG. 7A is a side view of a beam assembly 100, according to an embodiment. The assembly 100 of FIG. 7A is substantially similar to the beam assembly 100 of FIGS. 2A-2C, except that the beam assembly 100 of FIG. 7A includes first and second reinforcers 116a, 116b. The reinforcers 116a, 116b help to strengthen the beam members 102a, 102b.

In one embodiment, the first reinforcer 116a includes protrusions 118a. When the first reinforcer 116a is placed on the top surface of the first beam member 102a, the protrusions 118a protruding into the first compression elements 106a. This greatly helps to strengthen the integrity of the first beam member 102a.

In one embodiment, the second reinforcer 116b includes protrusions 118b. When the first reinforcer 116a is placed on bottom top surface of the second beam member 102b, the protrusions 118b a protrude into the second compression elements 106b. This greatly helps to strengthen the integrity of the second beam member 102b.

FIG. 7B is a cross-sectional view of the beam assembly 100 of FIG. 7A with the first and second reinforcers 116a, 116b coupled to the respective top bottom surfaces of the first and second beam members 102a, 102b, according to an embodiment. The cross-sectional view of FIG. 7B illustrates the protrusions 118 implanted into the compression elements 106a, 106b.

In one embodiment, the first and second reinforcers 116a, 116b include metal. In one embodiment, the first and second reinforcers 116a, 116b included iron, steel, aluminum, or another metal or alloy.

FIG. 7C is a perspective view of the beam assembly 100 of FIG. 7A, according to an embodiment. The reinforcers 116a, 116b are not coupled to the surfaces of the first and second beam members 102a, 102b in the view of FIG. 7C. FIG. 7C shows that the first reinforcer includes gaps 120a corresponding to areas from which the protrusions 118a are formed. The second reinforcer 116b includes gaps 120b corresponding to areas from the protrusions 118b are formed.

Figures 8A, 8B:
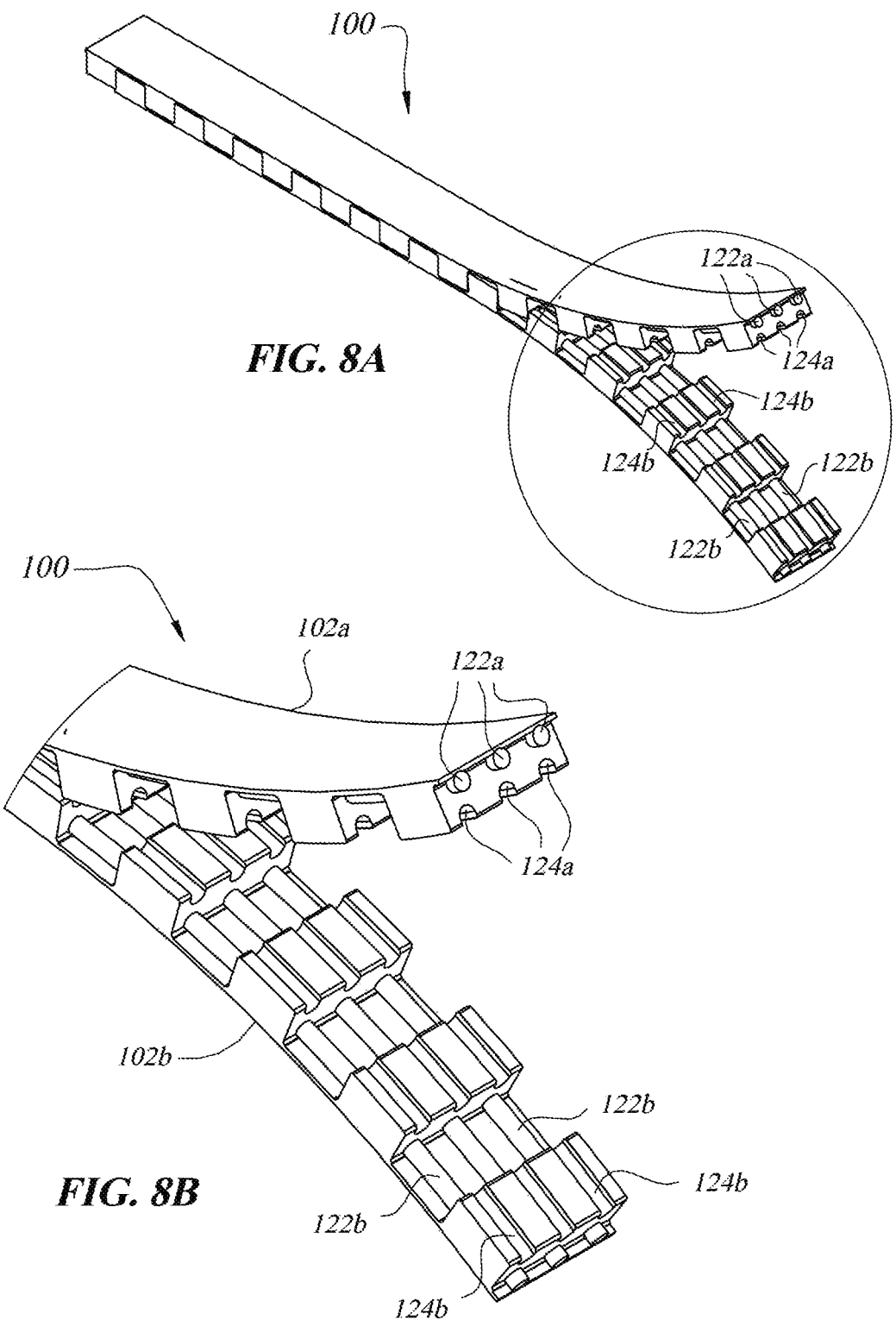
FIG. 8A is a side view of a beam assembly, according to an embodiment.
FIG. 8B is an enlarged view of a portion of the beam assembly of FIG. 8A, according to an embodiment.

FIG. 8A is a side view of a beam assembly 100, according to an embodiment. The assembly 100 of FIG. 8A is substantially similar to the beam assembly 100 of FIGS. 2A-2C, except that the beam assembly 100 of FIG. 8a includes first and second reinforcers 122a, 122b, and the first and second compression elements 106a, 106b include slots 124a, 124b. The reinforcers 122a, 122b help to strengthen the beam members 102a, 102b.

In one embodiment, the reinforcers 122a include metallic cables or filaments that pass through each of the compression elements 106a. The reinforcers 122a can include iron, steel, aluminum, or other metals or alloys. Reinforcers 122b include metallic cables or filaments that pass through each of the compression elements 106b. The reinforcers 122b can include iron, steel, aluminum, or other metals or alloys.

In one embodiment, when the first and second beam members 102a, 102b are joined, the reinforcers 122a are positioned in the slots 124b. Likewise, the reinforcers 122b are positioned in the slots 124a in the joined state.

FIG. 8B is an enlarged view of a portion of the beam assembly 100 of FIG. 8A. FIG. 8B more clearly illustrates the reinforcers 122a, 122b, and the slots 124a, 124b.

Figure 9A:
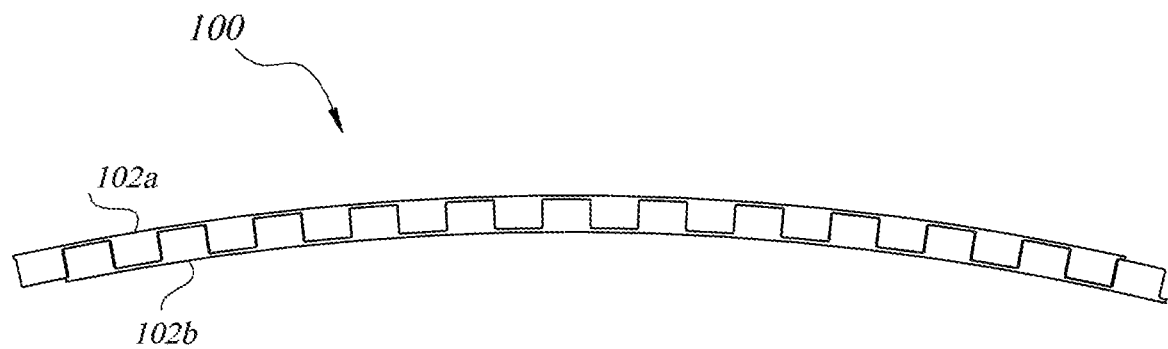
FIG. 9A is a side view of a beam assembly, according to an embodiment.
Figure 9B:
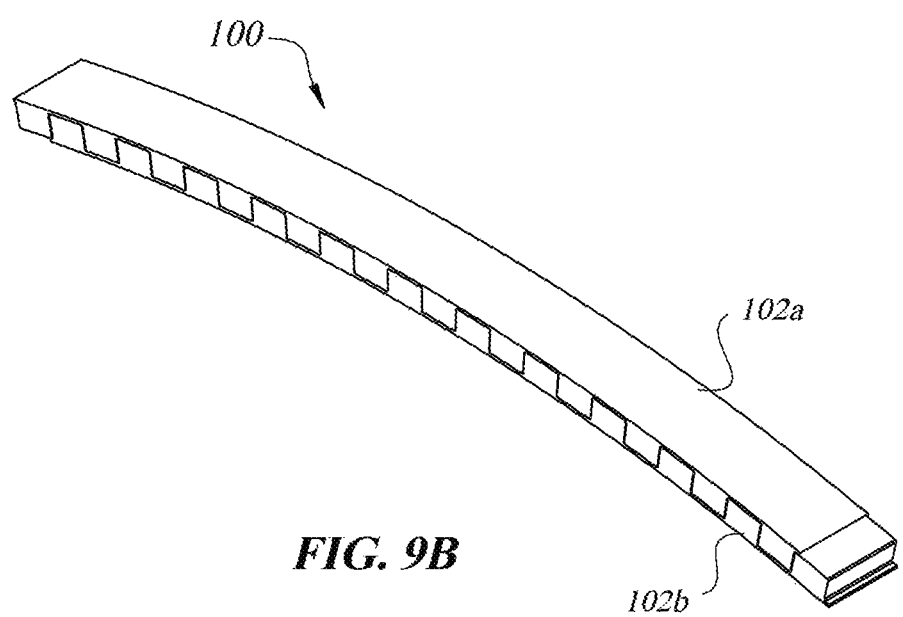
FIG. 9B is a perspective view of the beam assembly of FIG. 9A, according to an embodiment.

FIG. 9A is a side view of a beam assembly 100, according to an embodiment. The assembly 100 includes a first beam member 102a and a second beam member 102b. Beam assembly 100 of FIG. 9A is substantially similar to the beam assembly 100 of FIGS. 2A-2C, except that the beam assembly 100 of FIG. 9A is bent when in the joined state. This illustrates that the first and second beam members 102a, 102b can be configured to form beams that are not straight. Instead, the beams can be bent in a desired or selected manner. The beam 100 of FIG. 9A is stiff in the joined state. FIG. 9B is a perspective view of the beam assembly 100 of FIG. 9A.

Figure 10A:
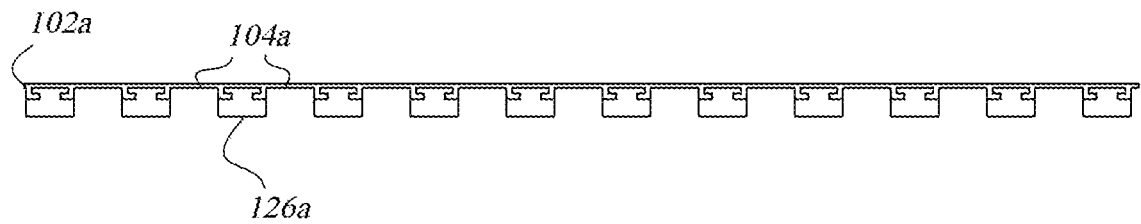
FIG. 10A is a side view of a beam member, according to an embodiment.
Figure 10B:
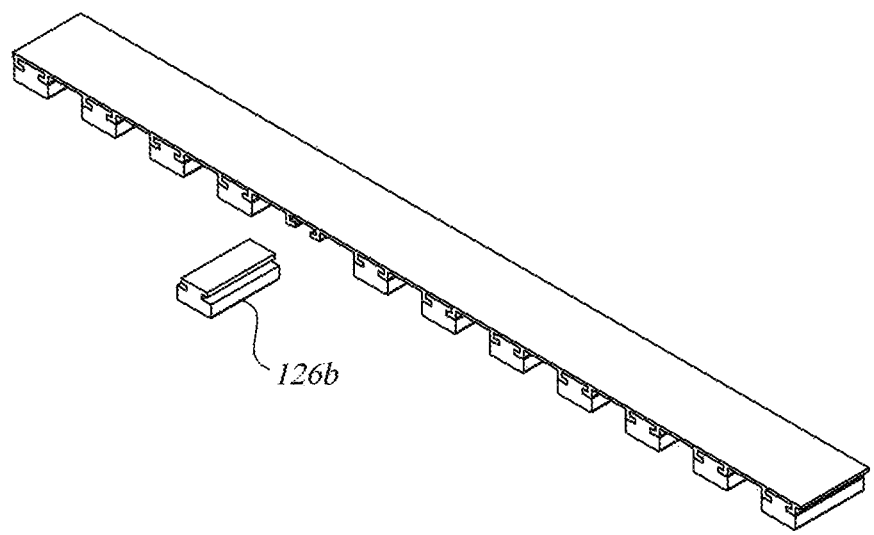
FIG. 10B is a perspective view of the beam member of FIG. 10A, according to an embodiment.

FIG. 10A is a side view of a beam member 102a, according to an embodiment. The beam member 102a includes inserts 126a joined with compression elements of the beam member 102a to form an augmented compression element. A second beam member (not shown) can include complementary inserts to form augmented compression elements. The first and second beam members can then be joined together to form a stiff beam assembly 100 as described in relation to previous figures. FIG. 10B is a perspective view of the beam member 102a of FIG. 10A.

Figure 11A:
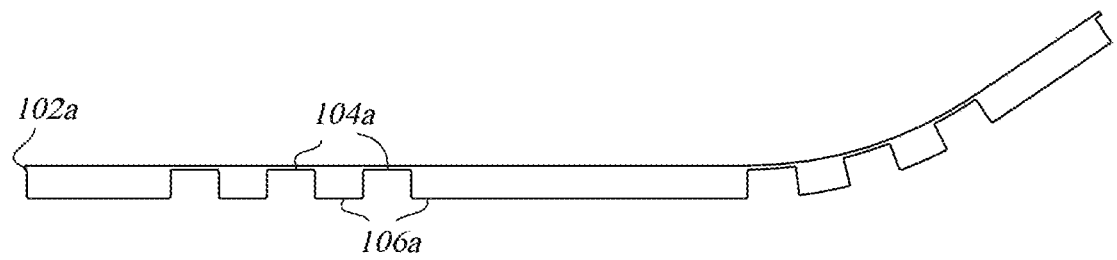
FIG. 11A is a side view of a beam member, according to an embodiment.
Figure 11B:
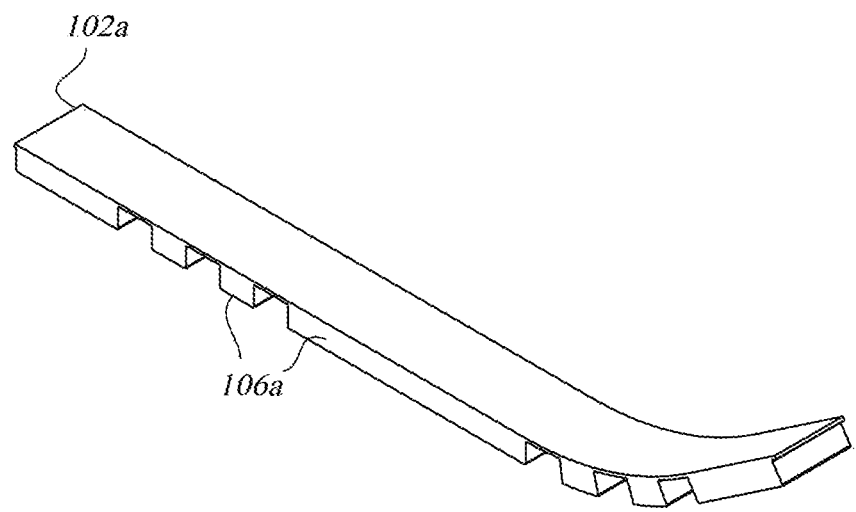
FIG. 11B is a perspective view of the beam member of FIG. 11A, according to an embodiment.

FIG. 11A is a side view of a beam member 102a, according to an embodiment. The beam member 102a includes compression elements 106a of varying length. A second beam member (not shown) in FIG. 11A can include complementary inserts intentional moments and compression elements to meet with the beam member 102a in order to form a stiff beam assembly 100 in the joined state. FIG. 11B is a perspective view of the beam member 102a of FIG. 11A.

Figure 12:
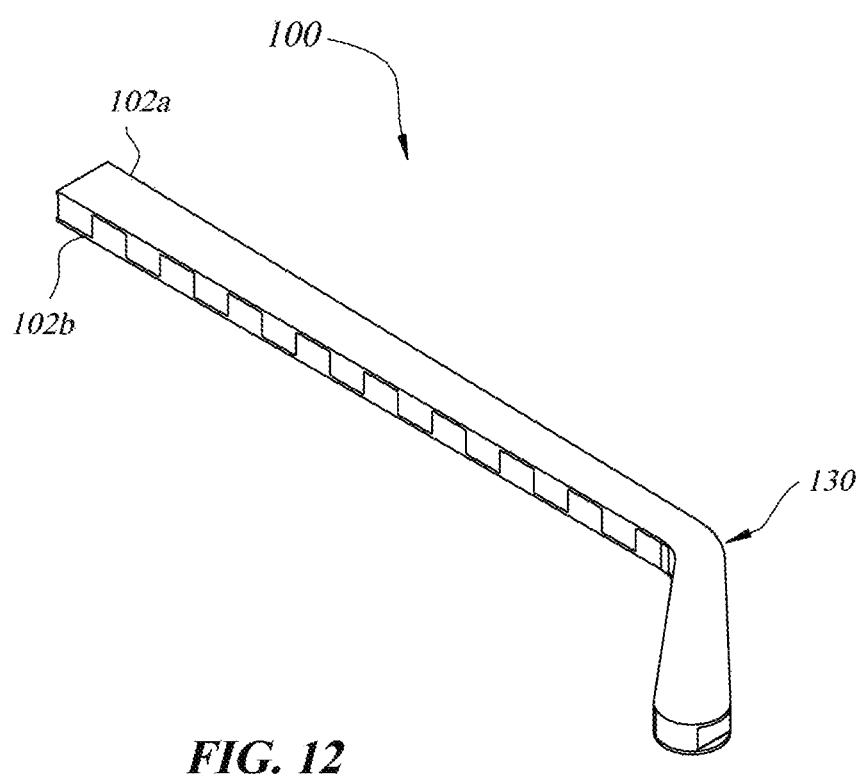
FIG. 12 is a perspective view of a beam assembly, according to an embodiment.

FIG. 12 is a perspective view of a beam assembly 100, according to an embodiment. The beam assembly 100 includes a first beam member 102a and a second beam member 102b. The first and second beam members 102a, 102b are substantially similar to the first and second beam members 102a, 102b of FIGS. 2A-2C, except that the first and second beam members 102a, 102b have a bend 130. The bend 130 is present in the separated state and in the joined state. Thus, beam assemblies 100 in accordance with principles of the present disclosure can be manufactured with shapes that are not straight.

Figure 13:
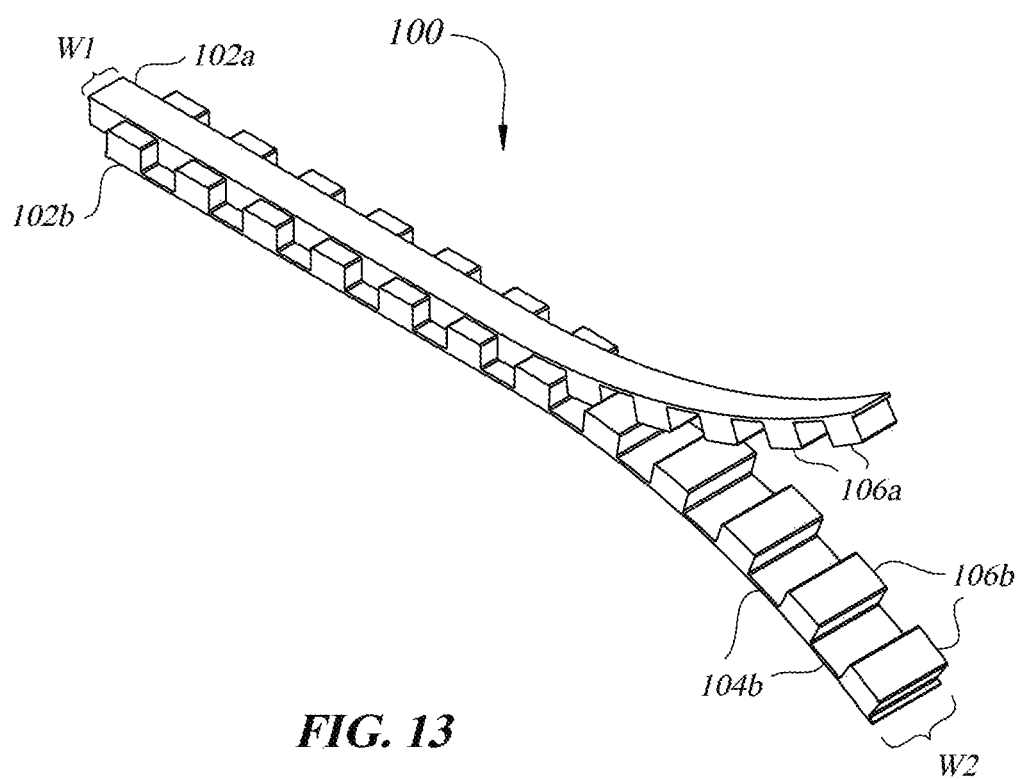
FIG. 13 is a perspective view of a beam assembly, according to an embodiment.

FIG. 13 is a perspective view of a beam assembly 100, according to an embodiment. The beam assembly 100 includes a first beam member 102a and the second beam member 102b. The beam assembly 100 of FIG. 13 is substantially similar to the beam assembly 100 of FIGS. 2A-2C, except that the first and second beam members 102a, 102b have differing widths. In particular, the first beam member 102a has a width W1, while second beam member 102b has a width W2 that is greater than W1. Accordingly, the first and second beam members 102a, 102b can have differing widths according to various embodiments.

Figure 14:
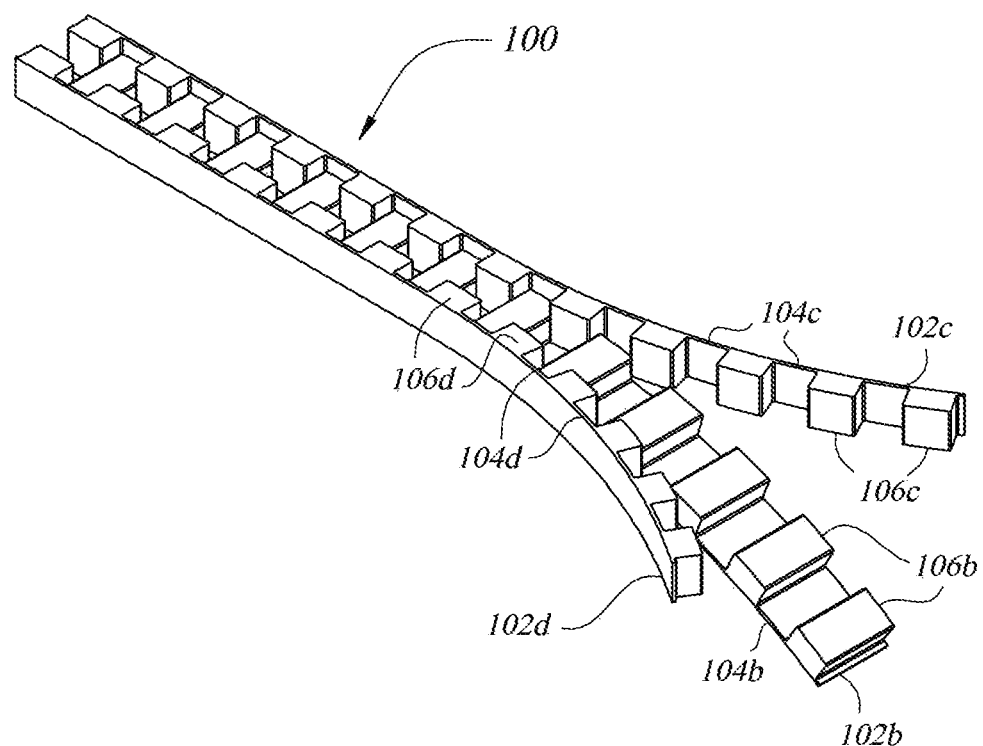
FIG. 14 is a perspective view of the beam assembly according to an embodiment.

FIG. 14 is a perspective view of the beam assembly 100 according to an embodiment. The beam assembly 100 of FIG. 14 includes a beam member 102b, a beam member 102c, and a beam member 102b. A beam member 102a (not shown) can also be present.

In one embodiment, the beam member 102c has tension elements 104c and compression elements 102c substantially similar to the tension elements and compression elements described in relation to FIGS. 2A-2C. The beam member 102d has tension elements 104d and compression elements 106d substantially similar to the tension elements and compression elements described in relation to FIGS. 2A-2C.

In one embodiment, the beam members 102c, 102d are oriented perpendicular to the beam member 102b. The compression elements 106d and 102c are positioned between, or interleaved with, the compression elements 106b. In one embodiment, a beam member 102a can be placed on top of the beam member 102b.

Figure 15A:
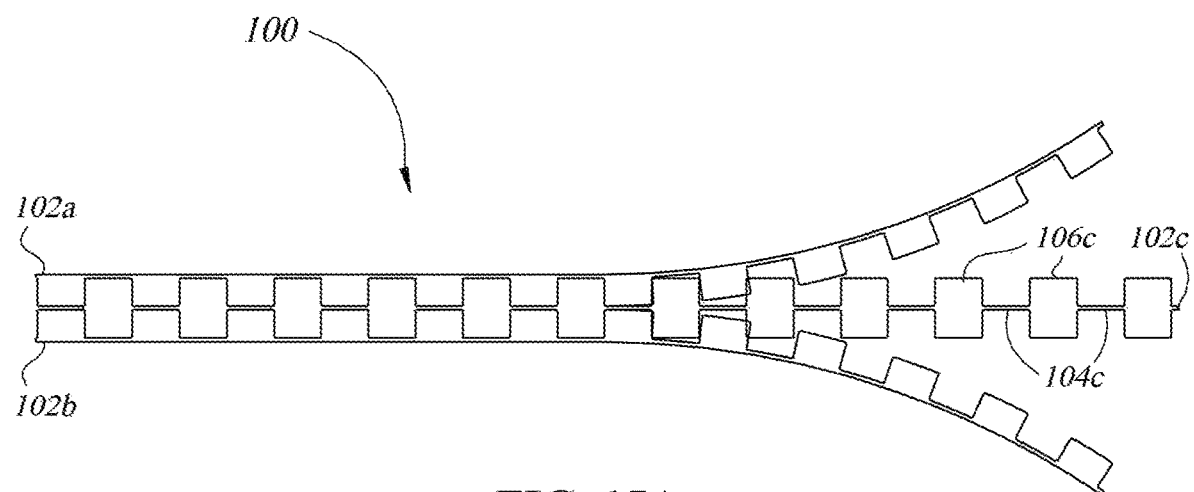
FIG. 15A is a side view of a beam assembly, according to an embodiment.

FIG. 15A is a side view of a beam assembly 100, according to an embodiment. The beam assembly 100 includes a first beam member 102a, a second beam member 102b, and the third beam member 102c. The first and second beam members 102a, 102b can be substantially similar to the beam members 102a, 102b of FIGS. 2A-2C. The third beam member can include compression 102c elements that extend both upward and downward from tension elements 104c. The first, second, and third beam members 102a, 102b, 102c are substantially flexible when in the separated state.

Figure 15B:
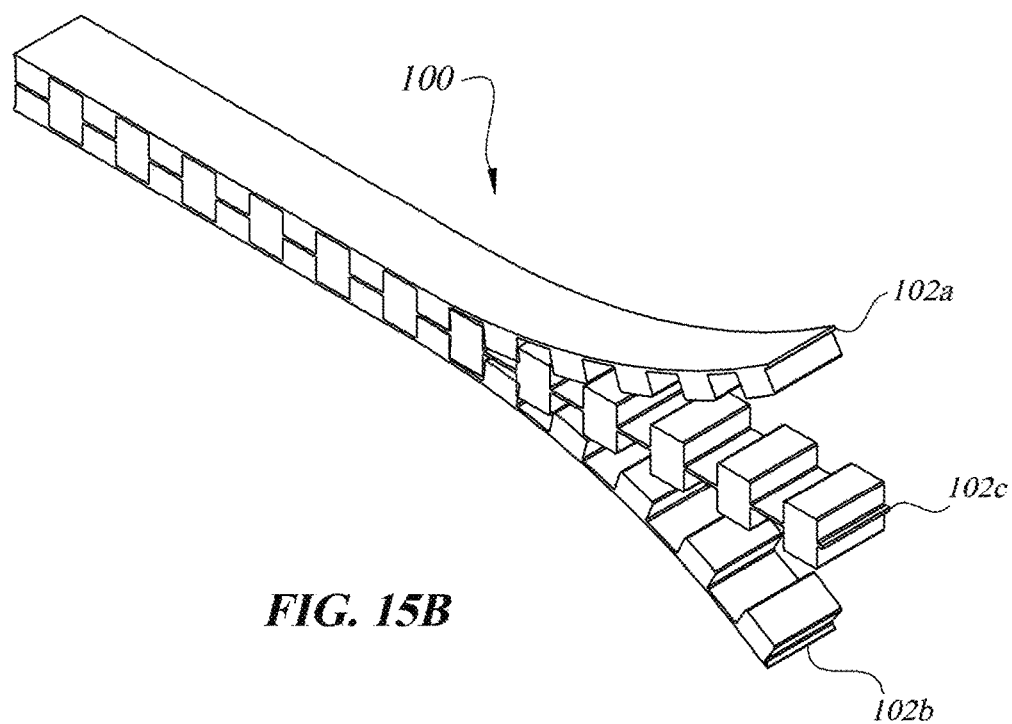
FIG. 15B is a perspective view of the beam assembly of FIG. 15A.

In one embodiment, the beam assembly 100 of FIG. 15a is placed in the joined state by placing the beam member 102c on the beam member 102b and by placing the beam member 102a on the beam member 102c. In the joined state, the compression elements of the first and second beam members 102a, 102b are positioned between, or interleaved with, the compression elements 102c of the third beam member 102c. The compression elements of the beam members 102a, 102b our contact with the tension elements 104c. The beam assembly 100 is substantially rigid when the beam members 102a, 102b, 102c are in the joined state. FIG. 15B is a perspective view of the beam assembly 100 of FIG. 15A.

Figure 16:
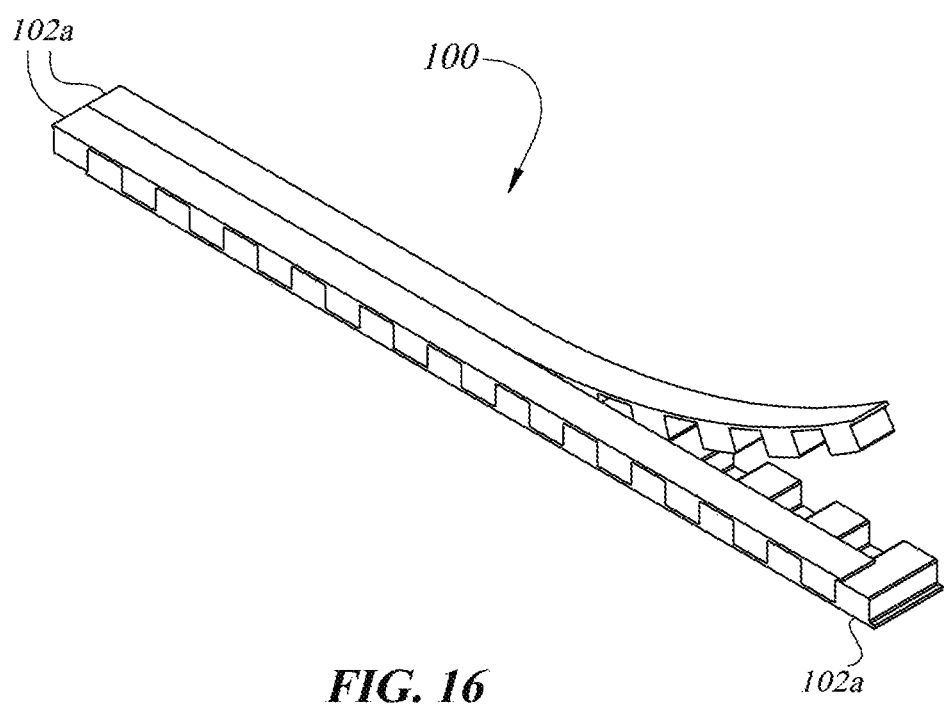
FIG. 16 is a perspective view of a beam assembly, according to an embodiment.

FIG. 16 is a perspective view of a beam assembly 100, according to an embodiment. The beam assembly 100 of FIG. 16 includes two first beam members 102a, and a second beam member 102b. Each of the members 102a has a width that is about half the width of the beam member 102b. All the beam members 102a, 102b are substantially when flexible separated from each other. In the joined state, the beam members 102a, 102b are placed on the beam member 102b substantially similar to how a first beam member 102a is joined to the first beam member 102b in FIGS. 2A-2C.

Figure 17:
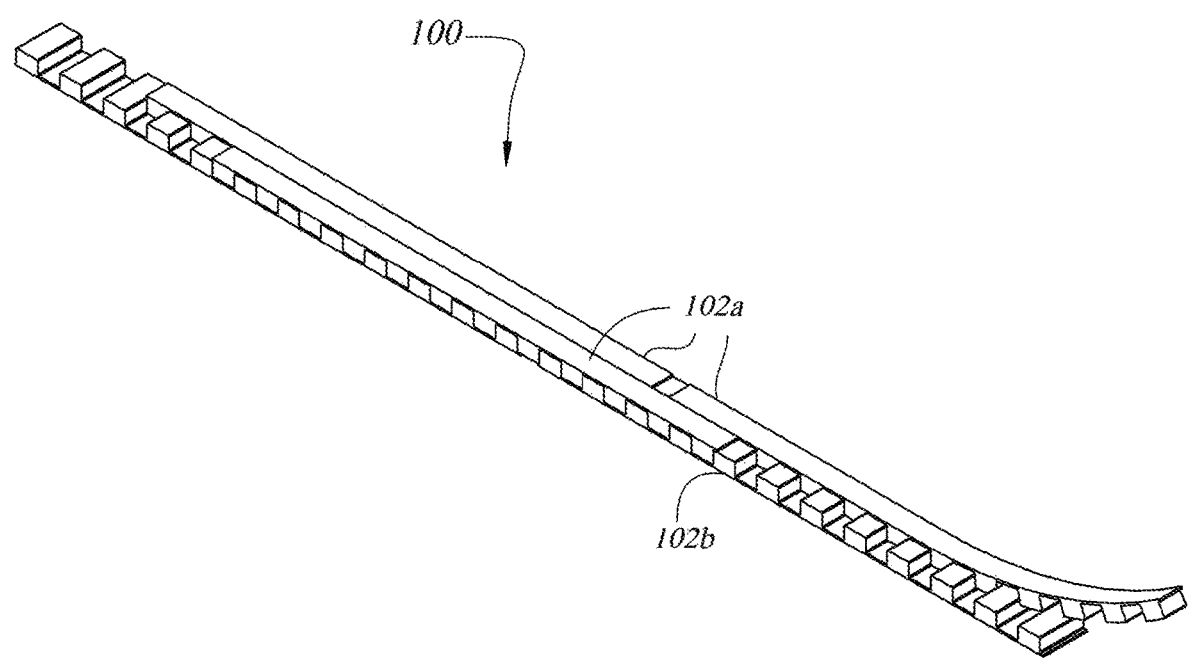
FIG. 17 is a perspective view of a beam assembly, according to an embodiment.

FIG. 17 is a perspective view of the beam assembly 100, according to an embodiment. The beam assembly 100 includes three first beam members 102a, and the second beam member 102b. In the joined state, the first beam members 102a are placed on the second beam member 102b in a staggered manner.

Figure 18:
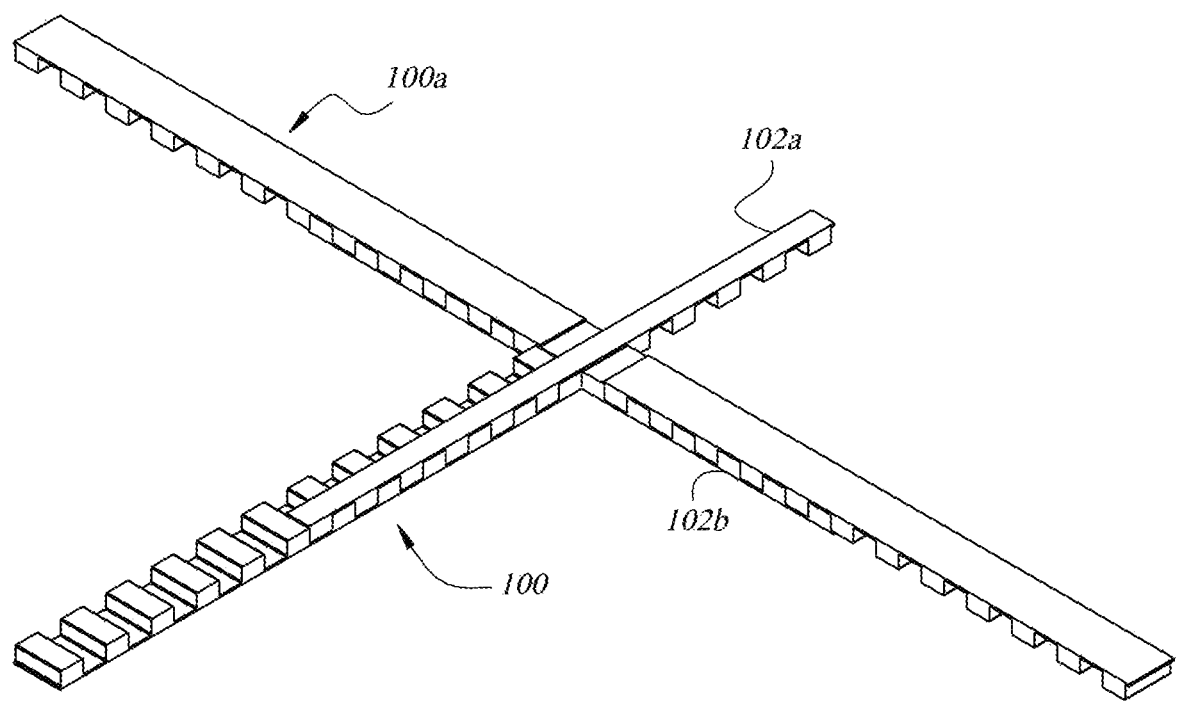
FIG. 18 is a perspective view of a first beam assembly and a second beam assembly, according to an embodiment.
Figure 19A:
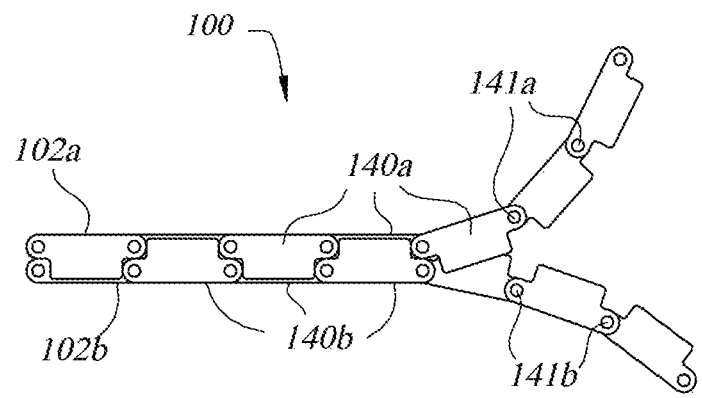
FIG. 19A is a side view of a beam assembly in a partially joined state, according to an embodiment.

FIG. 18 is a perspective view of a first beam assembly 100a and a second beam assembly 100b, according to an embodiment. The first and second beam assemblies 100a, 100b can be joined together perpendicularly as shown in FIG. 18. This can be accomplished by having a beam member 102a of the beam assembly 100b with a width that enables the compression elements of the beam member 102a to fit between two compression elements of a beam member 102b of the beam assembly 100a FIG. 19A is a side view of a beam assembly 100 and a partially joined state, according to an embodiment. The beam assembly 100 includes a first beam member 102a and a second beam member 102b. The first beam member 102a is configured as a chain made up of a plurality of first chain links 140a. The second beam member 102b is configured as a chain made up of a plurality of second chain links 140b. The first and second beam members 102a, 102b cooperate together to provide a beam assembly 100 that is substantially rigid one the first and second beam members 102a, 102b are joined together. Though not shown in the figures, in the fully joined state, the first and second beam members 102a, 102b of FIG. 19A form a flat beam when joined together, similar to the beam assembly 100 of FIG. 2C.

In one embodiment, the first beam member 102a includes a plurality of pins 141a that connect the chain links 148 together. The pins 141a enable rotation of the chain links relative to each other. Thus, the pins 141a enable the first beam member 102a to bend or flex. The pins 141a enable the first beam member 102a to be rolled up and stored when not joined with the second beam member 102b.

In one embodiment, the second beam member 102b includes a plurality of second pins 141b that connect the second chain links 140b together. The pins 141b enabling rotation of the second chain links 140b relative to each other. Thus, the second pins 141b enable the second beam member 102b to bend or flex. The pins 141b able the second beam member 102b the rolled up and stored when not joined with the first beam member 102a.

Figure 19B:
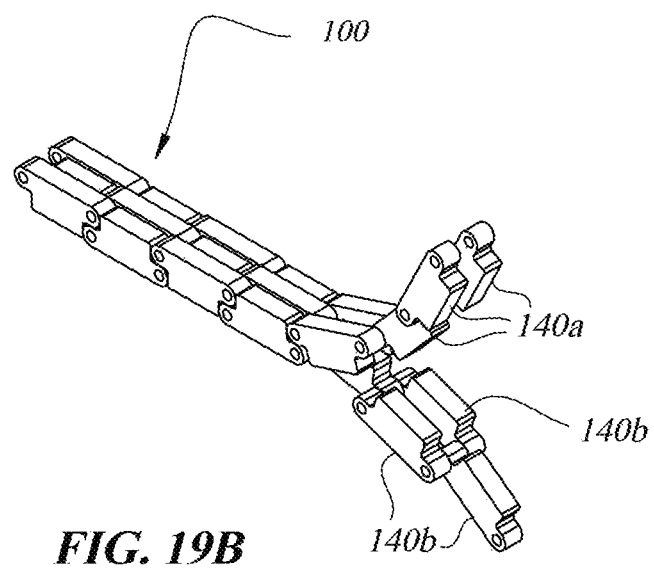
FIG. 19B is a perspective view of the beam assembly of FIG. 19A, according to an embodiment.

FIG. 19B is a perspective view of the beam assembly 100 of FIG. 19A, according to an embodiment. When the first and second beam members are joined together, the first beam member 102a is positioned on the second beam member 102b such that the first chain links 140a and the second chain links 140b interleave with each other. When the first and second chain links 148, 140b are interleaved with each, the first and second beam members 102a, 102b are the joined state. In the joined state, the beam assembly 100 becomes substantially stiffer. In one example, in the joined state, the beam assembly 100 has a flexibility that is at least an order of magnitude less than the flexibility of either of the beam members 102a, 102b in the separated state. Another way to state this, is that the stiffness of the beam assembly 100 in the joined state is at least an order of magnitude greater than the stiffness of either of the beam members 102a, 102b in the separated state. In various embodiments, the flexibility of the beam assembly 100 in the joined state may be two orders of magnitude less than the flexibility of either of the beam members 102a, 102b in the separated state. In various embodiments, the flexibility of the beam assembly 100 in the joined state may be three or more orders of magnitude less than the flexibility of either of the beam members 102a, 102b in the separated state.

Accordingly, the beam assembly 100 of FIGS. 19A, 19B of many of the same benefits of the previously described embodiments of beam assemblies 100. The beam assembly 100 of FIGS. 19A, 19B has an additional vantage that the chain links of the beam members 102a, 102b can be made entirely of metal or other very strong materials. In other words, the beam assembly 100 of FIGS. 19A, 19B can be made of materials that are by themselves, highly stiff or inflexible. The flexibility of the individual beam members 102a, 102b is enabled by the pins 141a, 141b that join the links together. The overall flexibility is reduced by joining the first and second beam members 102a, 102b together in the joined state. In one embodiment, the first and second beam members 120a, 102b of FIGS. 19A, 19B can include a metal such as iron, steel, or aluminum. Other highly stiff metals and alloys can be used.

Figure 20A:
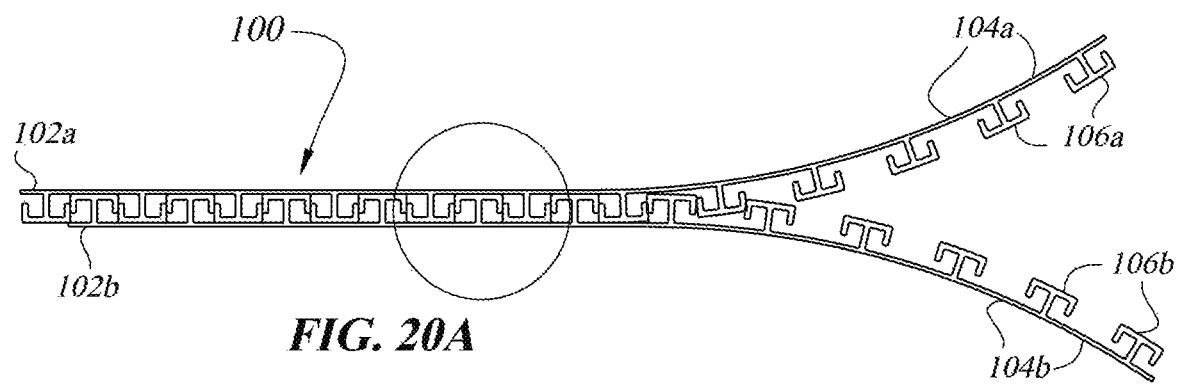
FIG. 20A is a side view of the beam assembly in a partially joined state, according to one embodiment.

FIG. 20A is a side view of the beam assembly 100 in a partially joined state, in accordance with one embodiment. The beam assembly 100 of FIG. 20A includes a first beam member 102a and a second beam member 102b. The first beam member 102a includes a plurality of tension elements 104a and a plurality of compression elements 106a. The compression elements 106a include T-shaped members or protrusions that protrude downward from the top surface of the first beam member 102a. The second beam member 102b includes a plurality of second tensions members 104b and second compression elements 106b.

In one embodiment, the first and second beam 102a, 102b of FIG. 20A are individually flexible when separated from each other and collectively stiff when joined together. When joined together, the compression elements of each beam member inhibit the flexibility of the tension elements of the other beam member. The result is a relatively stiff beam assembly 100 in the joined state.

Figure 20B:
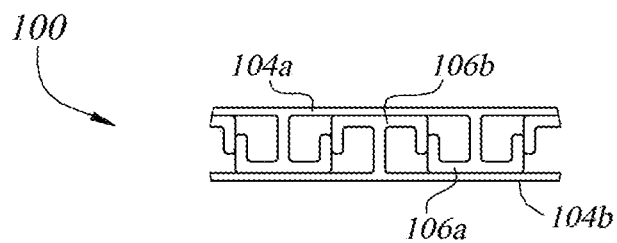
FIG. 20B is an enlarged view of a portion of the beam assembly of FIG. 20A, according to an embodiment.

FIG. 20B is an enlarged view of a portion of the assembly 100 of FIG. 20A, according to an embodiment. The enlarged view more clearly illustrates how the first and second prescient members contact each other in the joined state. The enlarged view also more clearly illustrates how the first and second compression elements of each beam member contacts the tension elements of the other beam member.

Figure 20C:
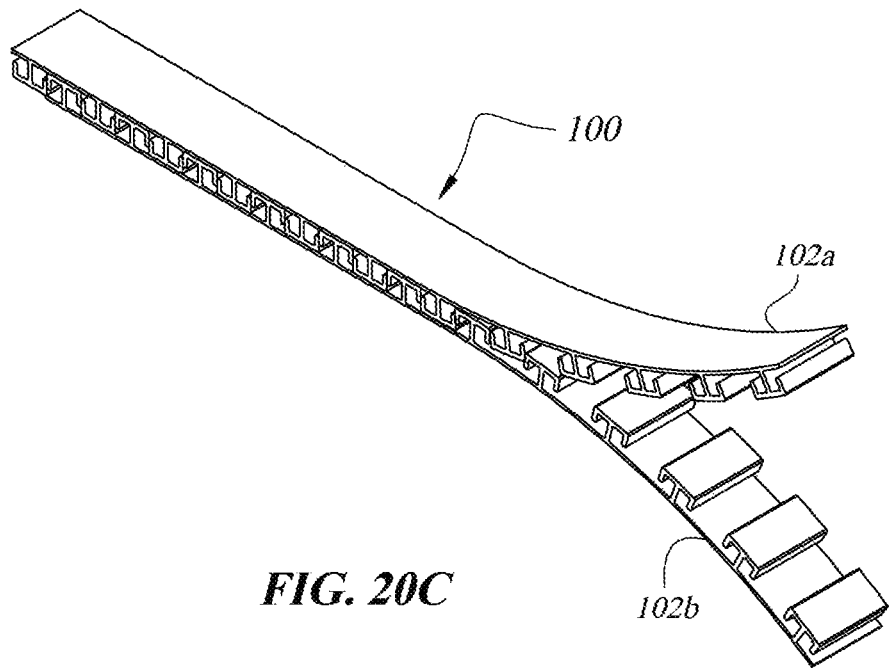
FIG. 20C is a perspective view of the beam assembly of FIG. 20A, according to an embodiment.

FIG. 20C is a perspective view of the beam assembly 100 of FIG. 20A. Though not illustrated, the beam assembly 100 of FIGS. 20A-C can be fully joined together into a substantially flat and stiff beam.

Figure 21A:
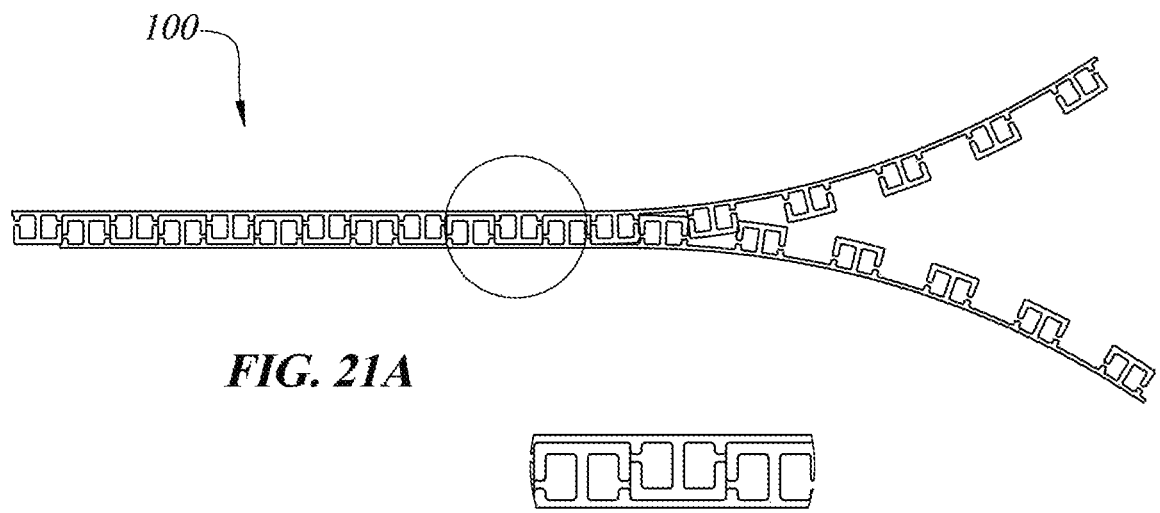
FIG. 21A is a perspective view of a beam assembly, according to an embodiment.
Figure 21B:
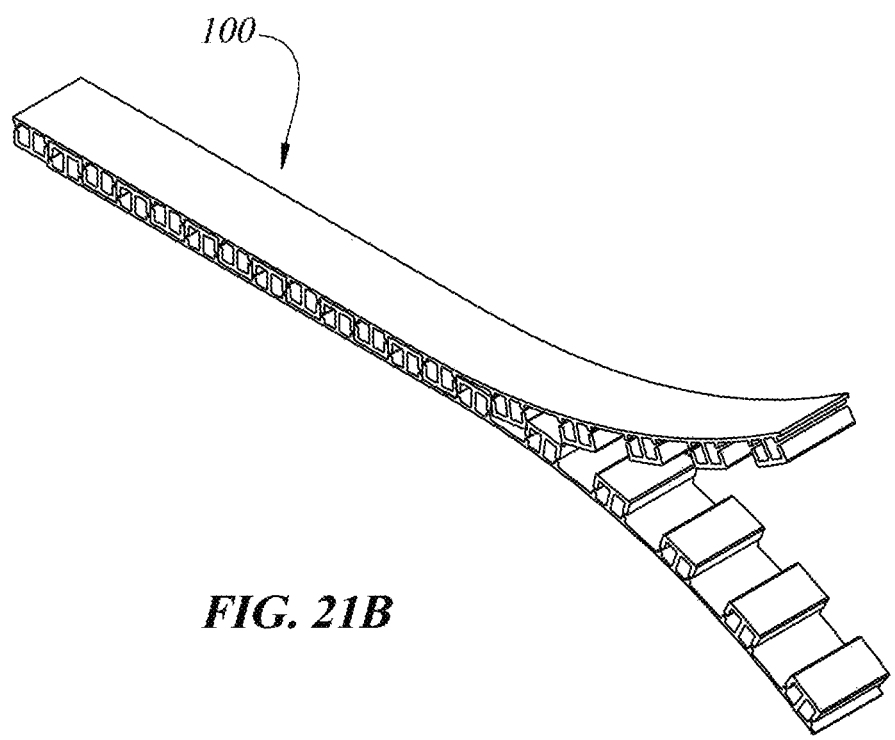
FIG. 21B is an enlarged view of a portion of the beam assembly of FIG. 21A, according to an embodiment.

FIG. 21A is a perspective view of a beam assembly 100, according to an embodiment. FIG. 21B is an enlarged view of a portion of the beam assembly 100 of FIG. 21A. FIG. 21C is a perspective view of the beam assembly 100 of FIG. 21A. The beam assembly 100 of FIGS. 21A-C is substantially similar to the beam assembly 100 of FIGS. 20A-C, except that the first and second compression elements 106a, 106b include additional protrusions above or below the T-shaped protrusions, depending on the orientation. The beam assembly 100 of FIGS. 21A-21C function substantially similar to the beam assembly 100 of FIGS. 20A-20C.

Figure 22:
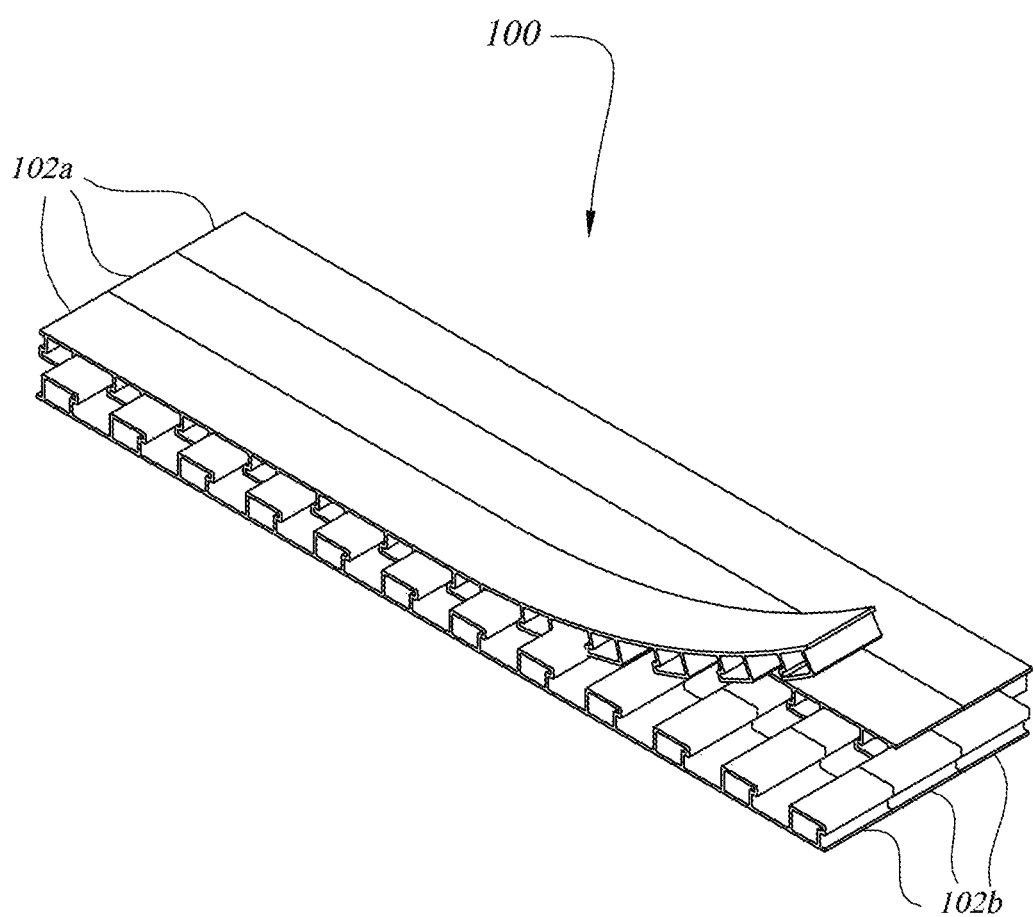
FIG. 22 is a perspective view of a beam assembly, according to an embodiment.

FIG. 22 is a perspective view of a beam assembly 100, according to an embodiment. The beam assembly 100 includes a plurality of first beam members 102a and a plurality of second beam members 102b. The first and second beam members 102a, 102b of FIG. 22 are substantially similar to the first and second beam members 102a, 102b FIGS. 5A, 5B.

Figure 23A:
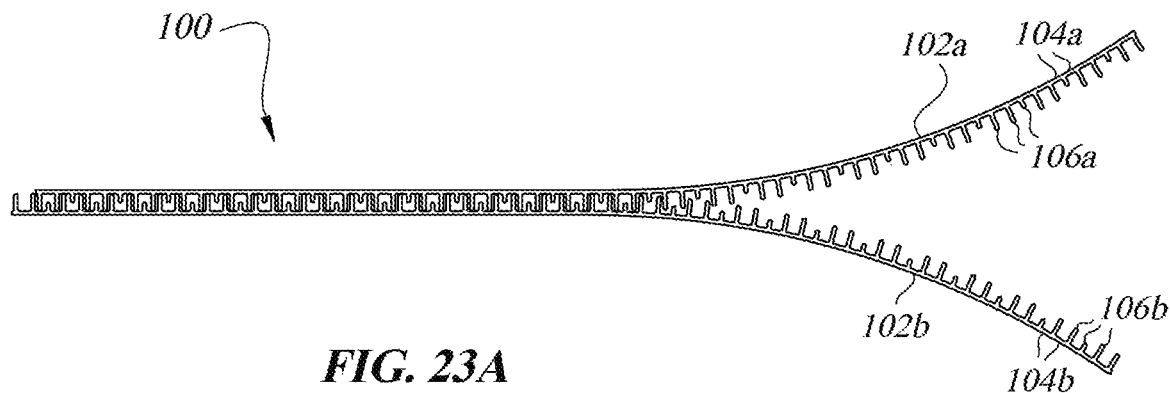
FIG. 23A is a side view of a beam assembly in a partially joined state, according to one embodiment.

In one embodiment, the beam assembly 100 of FIG. 22 illustrates how a relatively wide beam assembly 100 can be assembled by arranging multiple first beam members 102a in a side-by-side arrangement and multiple second beam members 102b in a side-by-side arrangement. The first beam members 102a can be placed on top of the second beam members 102b with a slight offset in a direction perpendicular to both the length and thickness directions of the beam assembly 100 this slight offset makes the beam assembly stable. Each individual first and second beam member 102a, 102b our substantially flexible in the separated state. The beam assembly 100 is substantially stiff in the joined state. Him FIG. 23A is a side view of the beam assembly 100 in a partially joined state, in accordance with one embodiment. The beam assembly 100 of FIG. 23A includes a first beam member 102a and a second beam member 102b. The first beam member 102a includes a plurality of first tension elements 104a and a plurality of first compression elements 106a. The compression elements 106a correspond to vertical protrusions from the top surface of the first beam member 102a. The second beam member 102b includes a plurality of second tension elements 104b and second compression elements 106b substantially similar to the first tension and compression elements 104a, 106a.

In one embodiment, the first and second beam 102a, 102b members of FIG. 23A are individually flexible when separated from each other and collectively stiff when joined together. When joined together, the compression elements of each beam member inhibit the flexibility of the tension elements of the other beam member. The result is a relatively stiff beam assembly 100 in the joined state.

Figure 23B:
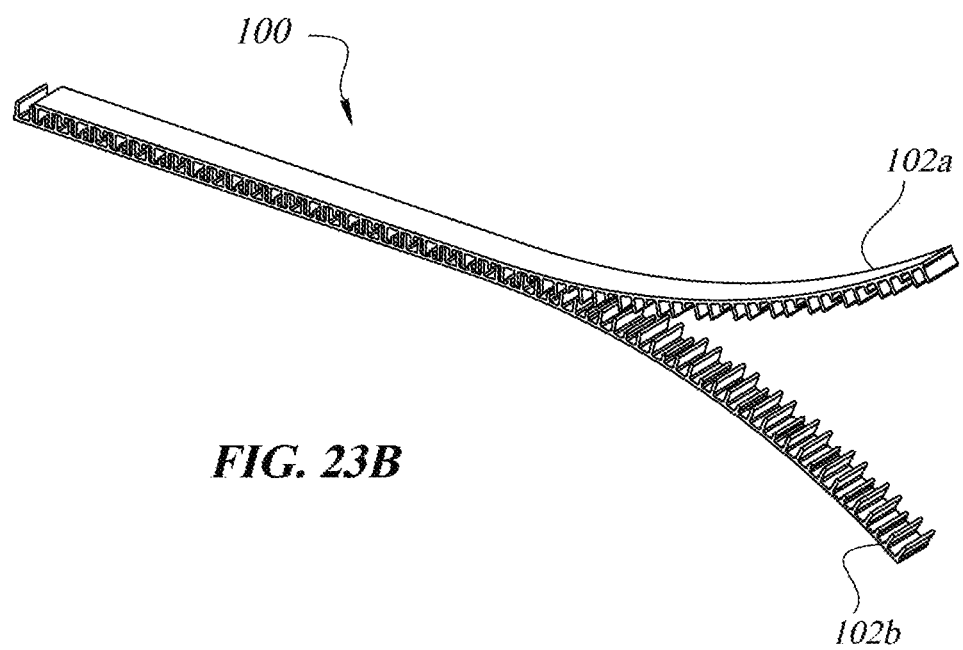
FIG. 23B is a perspective view of the beam assembly of FIG. 23A, according to an embodiment.

FIG. 23B is a perspective view of the beam assembly 100 of FIG. 23A. Though not illustrated, the beam assembly 100 of FIGS. 23A-B can be fully joined together into a substantially flat and stiff beam.

Figure 24:
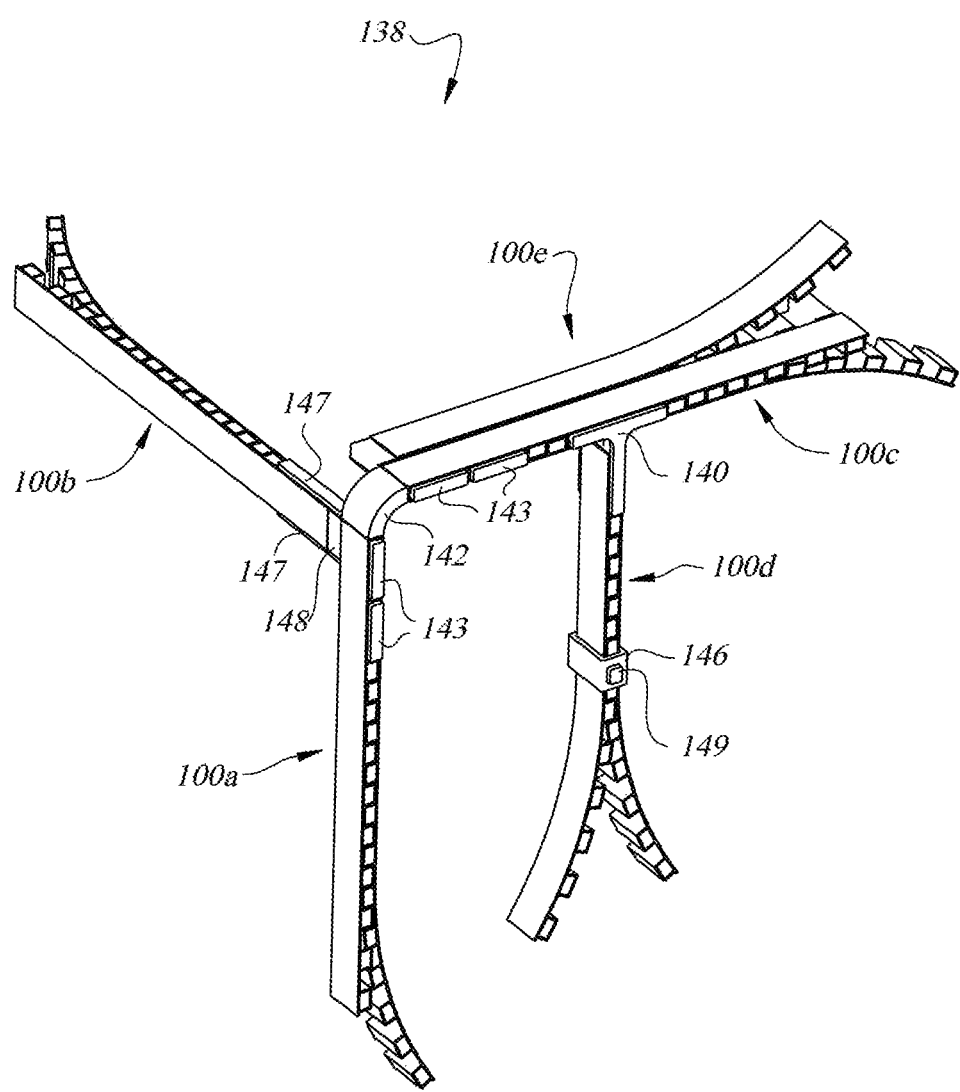
FIG. 24 is a perspective view of a beam assembly system 138, according to an embodiment.
Figure 25:
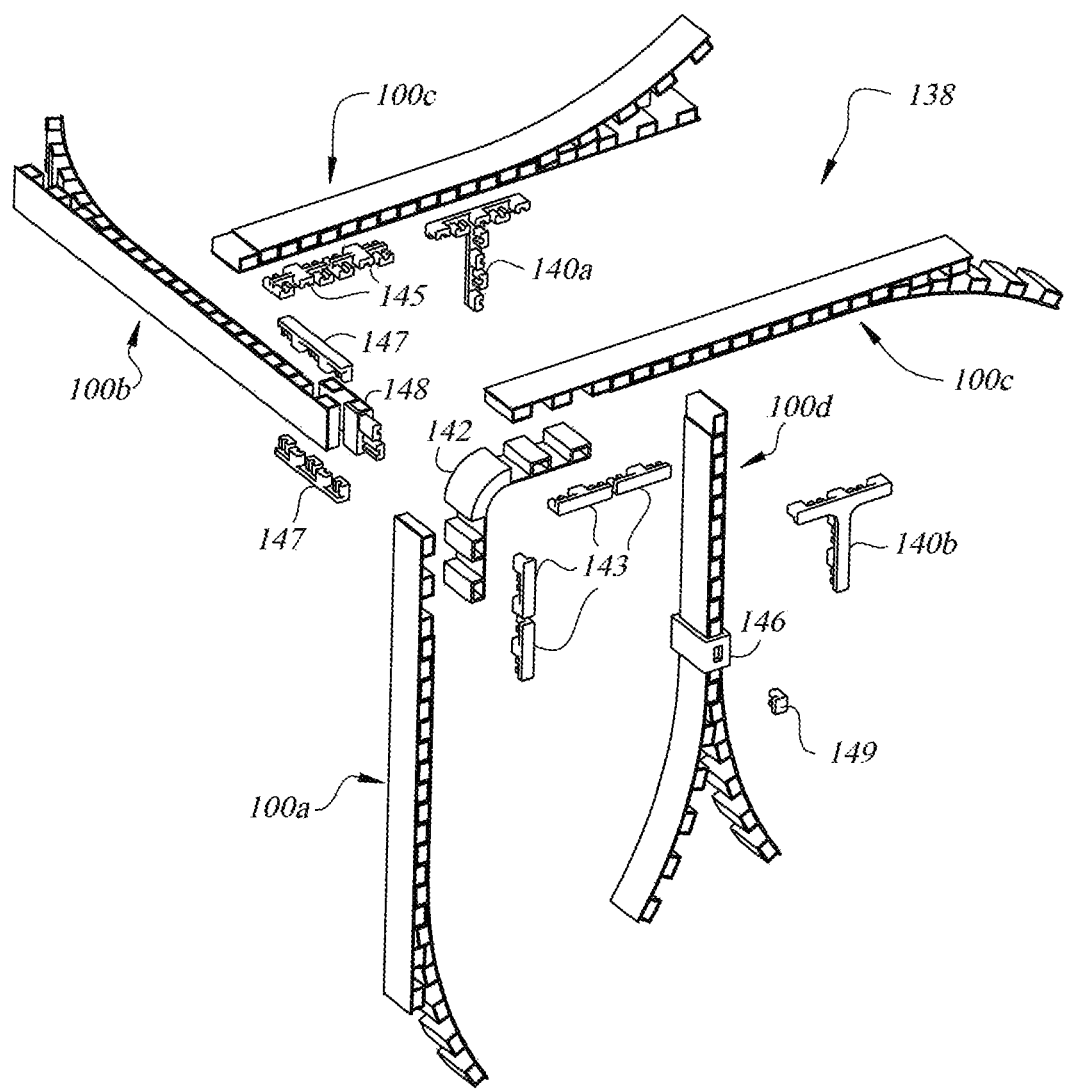
FIG. 25 is an exploded perspective view of the beam assembly system of FIG. 24.

FIG. 24 is a perspective view of a beam assembly system 138, according to an embodiment. FIG. 25 is an exploded perspective view of the beam assembly system 138 of FIG. 24. With reference to both FIG. 24 and FIG. 25, the beam assembly system 138 illustrates how multiple individual beam assemblies can be joined in various configurations.

As shown in FIG. 24, the beam assembly system 138 includes a first beam assembly 100a, a second beam assembly 100b, a third beam assembly 100c, and a fourth beam assembly 100d. In the example of FIG. 24, each of the beam assemblies includes hollow compression elements 102a, 102b as shown in FIGS. 3A, 3B.

In one embodiment, the second beam assembly 100b is attached at a right angle to an upper end of the first beam assembly 100a. The connector pieces 147 and 148 connect the second beam assembly 100b to the first beam assembly 100a. Each of the connector pieces 147, 148 include protrusions that fit into the hollow compression elements of the second beam assembly 100b and the first beam assembly 100a to securely connect the first and second beam assemblies 100a 100b as shown in FIG. 24 and FIG. 25. The connector pieces 147 connect the connector piece 148 to the second beam assembly 100b. The connector piece 148 then connects the beam assembly 100b to the beam assembly 100a at a right angle.

In one embodiment, connector pieces 142, 143 connect the beam assembly 100a to the beam assembly 100c. The connector piece 142 is a 90° curve enabling the beam assembly 100c to connect to the beam assembly 100a at a right angle with a gradual curve between the beam assembly 100c and the beam assembly 100a. The connector piece 142 includes tension elements and compression elements of the same shape and dimensions as the compression and tension elements of the beam assemblies 100a, 100c. The compression elements of the connector piece 142 are placed between compression elements of one of the beam members of the beam assembly 100. The connector pieces 143 include protrusions that fit within the hollow compression elements of the connector piece 142 and the beam assembly 100a. A first connector piece 143 connects the first beam member of the beam assembly 100a to the connector piece 142. A second connector piece 143 connects the connector piece 142 to a second beam member of the beam assembly 100a. The beam assembly 100c is then connected to the connector piece 142 in the same manner by two additional connector pieces 143.

In one embodiment, a T-shaped connector piece 140 connects the beam assembly 100b to the beam assembly 100c. The T-shaped connector piece 140 enables the beam assembly 100b to extend that a right angle relative to the beam assembly 100c from a midpoint of the beam assembly 100c. The T-shaped connector piece 140 includes a first T-shaped connector piece 140a and the second T-shaped connector piece 140b. The T-shaped connector pieces 140a, 140 include protrusions that fit within the hollow compression elements of the beam assembly 100c and the beam assembly 100d in order to securely couple the first beam assembly 100c to the beam assembly 100b.

In one embodiment, a connector piece 145 connects the beam assembly 100 to the beam sending 100c in a side-by-side configuration. The connector piece 145 includes protrusions that are placed into the hollow compression elements of the beam assembly 100c and the beam assembly 100e.

In one embodiment, a sliding mechanism 146 is positioned around the beam assembly 100d at an intermediate position on the beam simply 100d. The sliding mechanism 146 can be slid along the length of the beam assembly 180 joined the beam members of the beam assembly 100b together in the joint state. A locking piece 149 can be placed through an aperture in the sliding mechanism 146 into one of the compression elements of the beam assembly 100d. The locking piece 149 and sliding mechanism 146 can be utilized to place a selected portion of the beam assembly 100d in the joined state and the remainder of the beam assembly 100d separated state. Additionally, the sliding mechanism 146 can be slid along the entire length of the beam assembly 100d in order to place the entirety of the beam assembly 100d in the joined state.

In one embodiment, a sliding mechanism 149 can be utilized to place any beam assembly into the joined state. The ends of two compatible beam members 102a, 102b can be joined and then passed into the sliding mechanism 149. The sliding mechanism 149 can then be slid across the length of the beam members 102a, 102b to fully join the beam members 102a, 102b together.

The various components 142, 143 145-149 enable various types of connections between beam assemblies. The specific configuration shown in FIG. 24 and FIG. 25 given by way of example to illustrate possible types of connections impossible types of connector pieces so that multiple beam assemblies can be used to make complex structures with varied shapes. Those of skill the art will recognize, and like of the present disclosure, that other types of connector pieces are possible and that other types of connections are possible, without the parting from the scope of the present disclosure.

Figures 26A, 26B:
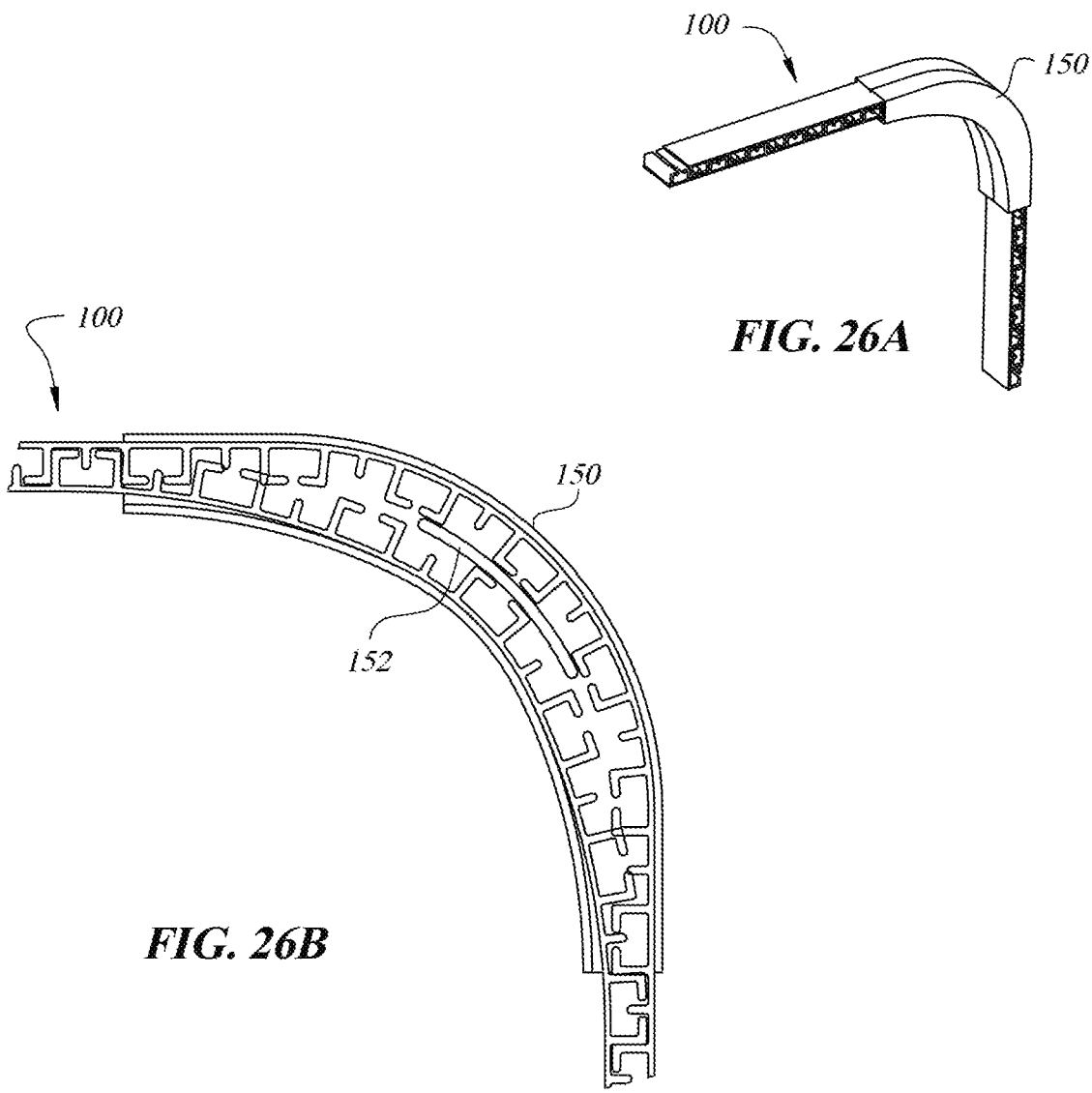
FIG. 26A is a perspective view of a beam assembly and a curve component, according to an embodiment.
FIG. 26B is a side sectional view of the curve component of FIG. 26A, according to an embodiment.

FIG. 26A is a perspective view of a beam assembly 100 and a curve component 150, according to an embodiment. The component 150 can force a curve into the in assembly 100. The curve component 150 can have a selected radius of curvature and total angle of curvature. Accordingly, the curve component 150 can force a curve other than that shown in FIG. 26A.

In one embodiment, the curve component 150 is hollow. The beam assembly 100a opening is fed into the curve component 150 until the beam assembly 100 protrudes from a second opening in the curve component 150.

FIG. 26B is a side sectional view of the curve component 150 of FIG. 26A, according to an embodiment. The curve component 150 includes a separator 150. As the beam assembly 100 is passed into the interior of the curve component 150, the beam assembly captures the separator 152. The separator 150 forces separation of the first and second beam members 102a, 102b in the location of the separator 152. The separation of the first and second beam members 102a, 102b enables the first and second beam members 102a, 102b to become flexible location and availability. The beam members 102a, to be can then curve location of the separator 152. As the beam assembly 100 continues to pass through the curve component 150, the second opening of the curve component forces the beam members 102a, 102b to rejoin each other in the joined state. Thus, the beam assembly 100 is separated within the curve component 150 and is joined outside the curve component 150.

Figure 27A:
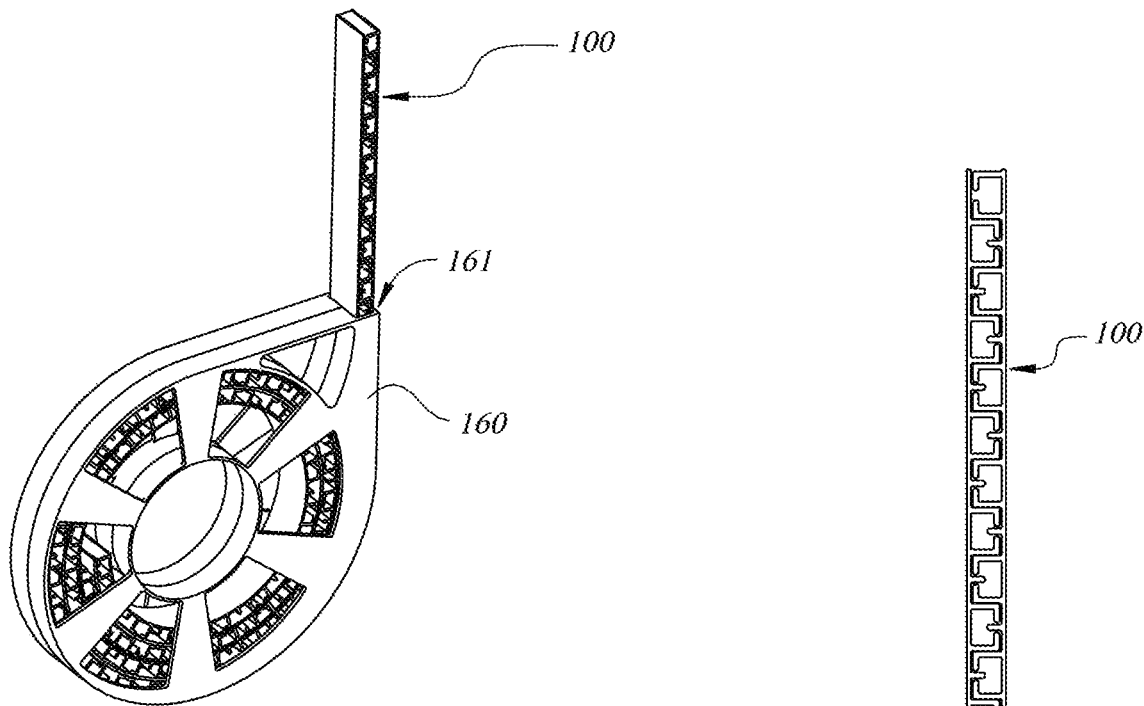
FIG. 27A is a perspective view of a beam storage and a beam assembly, according to an embodiment.

FIG. 27A is a perspective view of a beam storage 160 and a beam assembly 100, according to an embodiment. The beam assembly 100 is stored in a rolled up configuration within the beam storage 160. This enables long beam assemblies 100 to be stored in a relatively compact space. The assembly will hundred can be stored in the beam storage 160 bypassing the beam assembly 100 the opening 161 of the beam storage 160.

Figure 27B:
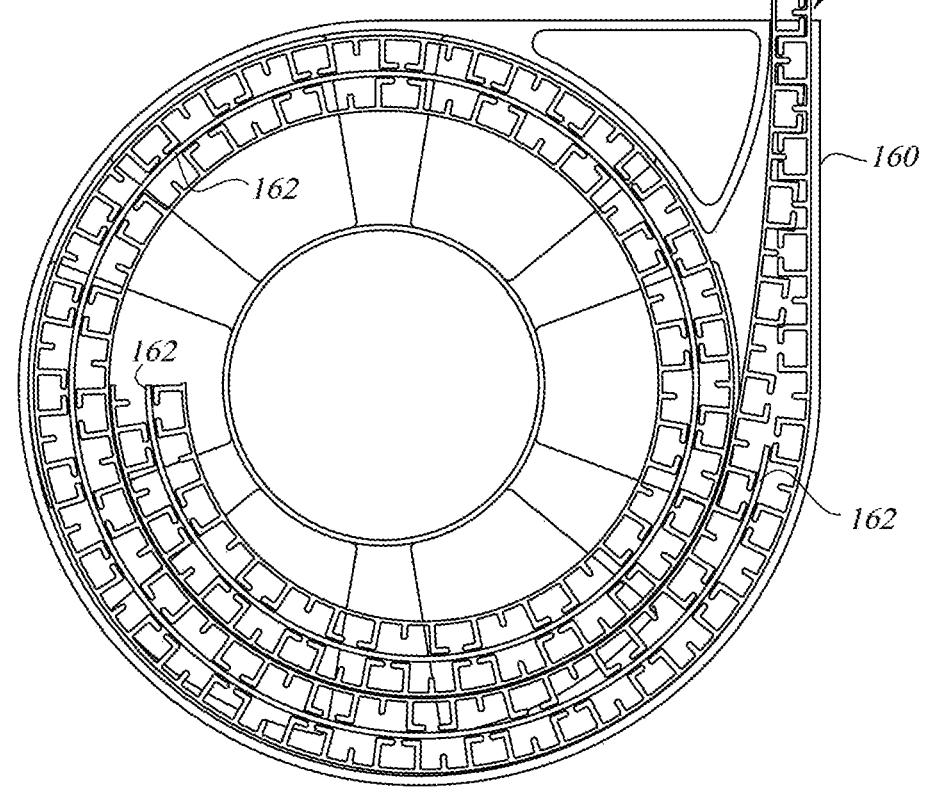
FIG. 27B is a side sectional view of the beam storage and the beam assembly of FIG. 27A, according to an embodiment.

FIG. 27B is a side sectional view of the beam storage 160 and the beam assembly 100 of FIG. 27A, according to an embodiment. The storage 160 includes a spiral separator 162 positioned within an interior of the beam storage 160. The spiral separator 160 policy spiraling trajectory within the interior of the beam storage 160.

In one embodiment, when the beam assembly 100 is to be stored within the storage 160, beam assembly 100 is passed through the opening 161 into the interior of the beam storage 160. As the beam assembly 100 is passed into the carrier of the beam storage 160, beam assembly 100 encounters the spiral separator 162. When the beam assembly 100 encounters the spiral assembly 162, the spiral separator 162 forces the separation of the first and second beam members 102a, 102b. The separated beam members 102a, 102b are relatively flexible compared to the joint state. This enables the separated beam members 102a, 102b to be rolled. In particular, as the beam assembly 100 is fed into the beam storage 160, the beam 102a, 102b follow the spiral path of the spiral separator 162. The result is that the beam assembly 100 is rolled up within the beam storage 160. Those of skill in the art will recognize, in light of the present disclosure, that other devices or mechanisms can be used to roll up and store it beam assembly 100 without departing from the scope of the present disclosure.

In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
   a first beam member including:
   first tension elements; and
   first compression elements;
   a second beam member including:
   second tension elements; and
   second compression elements, wherein the first and second beam members are configured to join together to form a beam assembly by interleaving the first and second compression elements, wherein:
   the first tension elements extend between adjacent first compression elements;
   the second tension elements extend between adjacent second compression elements;
   the first compression elements each include a first gap;
   the first beam member includes a plurality of first vertical protrusions each protruding from a respective first tension element;
   the second compression elements each include a second gap;
   the second beam member includes a plurality of second vertical protrusions each protruding from a respective second tension element;
   each first protrusion extends into a respective second gap when the first and second beam members are joined together; and
   each second protrusion extends into a respective first gap when the first and second beam members are joined together.

2. The device of claim 1, wherein when the first and second beam members are separated from each other, the first and second beam members have a flexibility at least an order of magnitude greater than a flexibility of the beam assembly when the first and second compression elements are interleaved with each other.

3. The device of claim 2, wherein flexibility corresponds to linear deflection in a cantilevered configuration.

4. The device of claim 1, wherein: the first compression elements each include a respective first horizontal protrusion; and the second compression elements each include a respective second horizontal protrusion.

5. The device of claim 1, wherein:
   when the first and second beam members are joined together each first tension element contacts a respective second compression element; and
   when the first and second beam members are joined together each second tension element contacts a respective first compression element.

6. The device of claim 1, wherein the first and second beam members include a polymer material.

7. A device comprising:
   a first beam member including:
   a plurality of first flexible elements; and
   a plurality of first protrusions each protruding relative to the first flexible elements and each positioned between two first flexible elements;
   a second beam member including:
   a plurality of second flexible elements; and
   a plurality of second protrusions each protruding relative to the first flexible elements and each positioned between two second flexible elements, wherein the first and second beam members are configured to join together to form a beam assembly by interleaving the first and second protrusions;
   a first reinforcer coupled to a surface of the first beam member and including third protrusions protruding within the first protrusions; and a second reinforcer coupled to a surface of the second beam member and including fourth protrusions protruding within the second protrusions.

8. The device of claim 7, wherein a length of the first tension elements is approximately equal to a length of the first compression elements.

9. The device of claim 8, wherein a ratio of a thickness of the first compression elements to the length of the first tension elements is between 0.4 and 0.8.

10. A device, comprising:
a first beam member including:
  a plurality of first flexible elements,
  a plurality of first protrusions each protruding relative to the first flexible elements and each positioned between two first flexible elements;
  a plurality of first reinforcers each extending along a length of the first beam member and passing through the first protrusions; and
  a plurality of first slots positioned in the first protrusions;
a second beam member including:
  a plurality of second flexible elements;
  a plurality of second protrusions each protruding relative to the first flexible elements and each positioned between two second flexible elements;
  a plurality of second reinforcers each extending along a length of the second beam member and passing through the second protrusions; and
  a plurality of second slots positioned in the second protrusions, wherein, the first and second beam members are configured to join together to form a beam assembly by interleaving the first and second protrusions, the first slots are configured to receive the second reinforcers when the first and second beam members are joined together, and the second slots are configured to receive the first reinforcers when the first and second beam members are joined together.

11. The device of claim 10, wherein the first and second reinforcers are metal.

* * * * *